US 11,265,747 B2

(12) United States Patent
Siomina et al.

(10) Patent No.: US 11,265,747 B2
(45) Date of Patent: Mar. 1, 2022

(54) FIRST NETWORK NODE, SECOND NETWORK NODE, WIRELESS DEVICE, AND METHODS PERFORMED THEREBY

(71) Applicant: Telefonaktiebolaget LM Ericsson (publ), Stockholm (SE)

(72) Inventors: Iana Siomina, Täby (SE); Icaro L. J. da Silva, Solna (SE); Muhammad Kazmi, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 69 days.

(21) Appl. No.: 16/500,269

(22) PCT Filed: Mar. 28, 2018

(86) PCT No.: PCT/SE2018/050338
§ 371 (c)(1),
(2) Date: Oct. 2, 2019

(87) PCT Pub. No.: WO2018/186788
PCT Pub. Date: Oct. 11, 2018

(65) Prior Publication Data
US 2021/0105646 A1 Apr. 8, 2021

Related U.S. Application Data

(60) Provisional application No. 62/481,411, filed on Apr. 4, 2017.

(51) Int. Cl.
H04W 24/10 (2009.01)
H04W 24/08 (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

2016/0337893 A1* 11/2016 Gheorghiu ............ H04W 24/10

FOREIGN PATENT DOCUMENTS

| WO | 2011142710 A1 | 11/2011 |
| WO | 2018037333 A1 | 3/2018 |

OTHER PUBLICATIONS

Nokia, Alcatel-Lucent Shanghai Bell "Measurement coordination in LTE/NR tight interworking", (Year: 2016).*

(Continued)

Primary Examiner — Ayanah S George
(74) Attorney, Agent, or Firm — Murphy, Bilak & Homiller, PLLC

(57) ABSTRACT

Method, performed by a second network node (112), for handling a second configuration for second measurements to be performed by a wireless device (130). The second network node (112) determines (503) whether to configure the wireless device (130) with the second configuration. The second configuration is to configure the wireless device (130) with second measurement gaps to perform second measurements on a first or a second carrier. The determining (503) is based on at least one of: i) a first status of the first carrier, and ii) whether or not the wireless device (130) is configured with a first configuration by a first network node (111). The first configuration is to configure the wireless device (130) with first measurement gaps to perform first measurements on the first carrier. The second network node (112) also initiates (504) providing a first indication based on a first result of the determination.

25 Claims, 10 Drawing Sheets

(56) References Cited

OTHER PUBLICATIONS

Nokia, Alcatel-Lucent Shanghai Bell Measurement coordination in LTE/NR internetworking (Year: 2016).*

Unknown, Author, "3rd Generation Partnership Project; Technical Specification Group Radio Access Network; Study on New Radio Access Technology; Radio Interface Protocol Aspects (Release 14)", 3GPP TR 38.804 V1.0.0, Mar. 2017, pp. 1-56.

Unknown, Author, "Measurement coordination in LTE/NR tight interworking", 3GPP TSG-RAN WG2 Meeting #96, R2-168118, Reno, USA, Nov. 14-18, 2016, pp. 1-6.

Unknown, Author, "New WID on New Radio Access Technology", 3GPP TSG RAN Meeting #75, RP-170847, Dubrovnik, Croatia, Mar. 6-9, 2017, pp. 1-8.

* cited by examiner a)

b)

FIRST NETWORK NODE, SECOND NETWORK NODE, WIRELESS DEVICE, AND METHODS PERFORMED THEREBY

TECHNICAL FIELD

The present disclosure relates generally to a first network node and methods performed thereby for handling at least one of a first configuration for first measurements and a second configuration for second measurements to be performed by a wireless device having a first communication with the first network node. The present disclosure also relates generally to a second network node and methods performed thereby for handling a second configuration for second measurements to be performed by the wireless device. The present disclosure also relates generally to a wireless device and methods performed thereby for handling at least one of the first configuration for the first measurements and the second configuration for the second measurements to be performed by the wireless device. The present disclosure also relates generally to a wireless device and methods performed thereby for handling information relating to the wireless device.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Multi-Carrier Operation

In multicarrier or carrier aggregation (CA) operation, the UE is able to receive and/or transmit data to more than one serving cells. In other words, a CA capable UE may be configured to operate with more than one serving cell. The carrier of each serving cell may generally be called a component carrier (CC). In simple words, the component carrier (CC) means an individual carrier in a multi-carrier system. The term carrier aggregation (CA) may also be called, that is, it may be interchangeably called), "multi-carrier system", "multi-cell operation", "multi-carrier operation", "multi-carrier" transmission and/or reception. This means the CA may be used for transmission of signaling and data in the uplink and downlink directions. One of the CCs is the primary component carrier (PCC) or simply primary carrier or even anchor carrier. The remaining ones are called secondary component carriers (SCC) or simply secondary carriers or even supplementary carriers. The serving cell may be interchangeably called primary cell (PCell) or primary serving cell (PSC). Similarly, the secondary serving cell may be interchangeably called secondary cell (SCell) or secondary serving cell (SSC).

Generally, the primary or anchor CC carry the essential UE specific signaling. The primary CC, a.k.a. PCC, or PCell, exists in both uplink and downlink directions in CA. In case there is single UL CC, the PCell is obviously on that CC. The network may assign different primary carriers to different UEs operating in the same sector or cell.

In Dual Carrier (DC) operation, the UE may be served by at least two nodes called master eNB (MeNB) and secondary eNB (SeNB). More generally, in multiple connectivity, a.k.a., multi-connectivity, operation the UE may be served by two or more nodes, where each node may operate or manage one cell group, e.g., MeNB, SeNB1, SeNB2 and so on. More specifically, in multi-connectivity each node may serve or manage at least secondary serving cells belonging to its own cell group. Each cell group may contain one or more serving cells. The UE may be configured with PCC from both MeNB and SeNB. The PCells from MeNB and SeNB may be called PCell and PSCell respectively. The UE may be also configured with one or more SCCs from each of MeNB and SeNB. The corresponding secondary serving cells served by MeNB and SeNB are called SCells. The UE in DC may typically have separate Transmitter/Receiver (TX/RX) for each of the connections with MeNB and SeNB. This allows the MeNB and SeNB to independently configure the UE with one or more procedures e.g., radio link monitoring (RLM), Discontinuous Reception (DRX) cycle etc. on their PCell and PSCell respectively.

In multi-connectivity, all cell groups may contain serving cells of the same RAT, e.g., LTE, or different cell groups may contain serving cells of different RATs.

In E-UTRAN-NR dual connectivity, the master cell group (CG) may contain at least one E-UTRA PCell, while a secondary cell group may contain at least one NR PSCell. In this example, master CG and secondary CG may be managed by eNB and gNB, respectively.

In NR-E-UTRAN dual connectivity, the master cell group may contain at least one NR PCell, while the secondary cell group may contain at least one LTE PSCell. In this example, master CG and secondary CG may be managed by gNB and eNB, respectively.

According to 3GPP TR 38.804, v1.0.0, March 2017, "[i]f the measurement is configured to the UE in preparation for the Secondary Node Addition procedure, the master node should configure the measurement to the UE. In case of the intra-secondary node mobility, the secondary node should configure the measurement to the UE in coordination with the master node, if required. For the secondary node change procedure, the RRM measurement configuration is maintained by the secondary node which also processes measurement reporting". It may be noted that in LTE, the measurements are always configured by the master node.

Inter-Frequency Measurements and Measurement Gaps in LTE

Inter-frequency measurements in LTE may be conducted during periodic inter-frequency measurement gaps which may be configured in such a way that each gap starts at a System Frame Number (SFN) and subframe meeting the following conditions:

SFN mod T=FLOOR(gapOffset/10);
subframe=gapOffset mod 10;
with T=MGRP/10, where MGRP stands for "measurement gap repetition period". E-UTRAN may need to provide a single measurement gap pattern with constant gap duration for concurrent monitoring of all frequency layers and Radio Access Technologies (RATs). Two configurations may be supported by the UE, with MGRP of 40 and 80 ms, both with the measurement gap length (MGL) of 6 ms. In practice, due to the switching time, this leaves less than 6 but at least 5 full subframes for measurements within each such measurement gap. Shorter MGL has been recently also standardized in LTE.

In LTE, measurement gaps may be configured by the network to enable measurements on the other LTE frequencies and/or other RATs. The gap configuration may be signalled to the UE over the Radio Resource Control (RRC) protocol as part of the measurement configuration. The gaps may be common, i.e., shared by, for all frequencies, but the UE may measure only one frequency at a time within each gap.

NR Architecture

The so-called 5G system, from a radio perspective, started to be standardized in 3GPP and the so-called New Radio (NR) is the name for the radio interface. One of the characteristics is the frequency range going to higher frequencies than LTE, e.g., above 6 GHz, where it is known to have more challenging propagation conditions such as a higher penetration loss. To mitigate some of these effects, multi-antenna technologies such as beamforming will be massively used. Another NR characteristic is the use of multiple numerologies in DL and UL in a cell or for a UE and/or in different frequency bands. Yet another characteristic is the possibility to enable shorter latencies.

NR architecture is being discussed in 3GPP and the current concept is illustrated in FIG. 1. FIG. 1 is a schematic diagram illustrating a non-limiting example of a NR architecture, where eNB denotes LTE eNodeB, gNB denotes NR BS, and the lines between the nodes illustrate the corresponding interfaces which are under discussion in 3GPP, such as S1 and NG1. One NR BS may correspond to one or more transmission/reception points. EPC denotes the Evolved Packet Core, and the core network of 5G is denoted NextGen Core.

FIG. 2 is a schematic diagram illustrating non-limiting examples of NR deployment scenarios with NR BS which are discussed in 3GPP: non-centralized, co-sited, centralized and shared.

Both standalone and non-standalone NR deployments will be standardized in 3GPP. A standalone deployment may be understood as an NR cell where a UE may perform initial access, camp, in idle or inactive state, or operate in connected state. In that case, the gNodeB, that is, the node managing the NR cell, may be connected to the 5G core network (5GC). It may be noted that eLTE is an LTE version that may also be connected to the 5G core network. In NR standalone operation, there may be deployments where eLTE and NR share the same core network, that is, they may be connected to the 5GC. The standalone deployments may be single or multi-carrier, e.g., NR CA or dual connectivity with NR PCell and NR PSCell. The non-standalone deployments are currently meant to describe a deployment with a LTE PCell and a NR PSCell, although there may also be one or more LTE SCells and one or more NR SCells.

The following deployment options are explicitly captured in NR Work Item Description, RP-170847, New WID on New Radio Access Technology, NTT DoCoMo, March 2018:

This work item is aimed at supporting the following connectivity options:
For single connectivity option:
NR connected to 5G-CN (Option 2 in TR 38.801 section 7.1).
For Dual Connectivity options:
E-UTRA-NR DC via EPC where the E-UTRA is the master (Option 3/3a/3x in TR 38.801 section 10.1.2);
E-UTRA-NR DC via 5G-CN where the E-UTRA is the master (Option 7/7a/7x in TR 38.801 section 10.1.4);
NR-E-UTRA DC via 5G-CN where the NR is the master (Option 4/4A in TR 38.801 section 10.1.3)
Work on Option 4/4A will be started after the work on Option 2, 3 series and 7 series are completed.
. . .

The case of dual connectivity for Evolved Universal Mobile Telecommunications System Terrestrial Radio Access (EUTRA)-NR-DC, also called EN-DC, where EUTRAN, that is, LTE connected to EPC, is the Master Node (MN) while NR is the Secondary node (SN) may be considered of particular interest. The eNodeB for LTE may also be referred to as the MN, while the gNodeB having the NR cell may be referred to as the SN.

Existing methods for a wireless device to perform measurements in a multi-connectivity environment may result in a failure, or in usage or a wrong configuration to perform the measurements. This may in turn result in wasted energy, processing and radio resources by the nodes involved in the configurations, which may be particularly detrimental for the performance of the wireless device.

SUMMARY

It is an object of embodiments herein to improve the handling of a configuration of a wireless device to perform measurements, in a wireless communications network. It is a particular object of embodiments herein to improve the handling of a configuration of a wireless device to perform measurements in a multi-connectivity environment, in a wireless communications network.

According to a first aspect of embodiments herein, the object is achieved by a method performed by a second network node. The method is for handling a second configuration for second measurements to be performed by a wireless device. The second network node determines whether or not to configure the wireless device with the second configuration. The second configuration is to configure the wireless device with second measurement gaps to perform second measurements on one of: a first carrier and a second carrier. The determining is based on at least one of: i) a first status of the first carrier, and ii) whether or not the wireless device is configured with a first configuration by a first network node. The first network node has a first communication with the wireless device. The first configuration is to configure the wireless device with first measurement gaps to perform first measurements on the first carrier. The second network node initiates providing a first indication based on a first result of the determination to at least one of: a) the first network node and b) the wireless device.

According to a second aspect of embodiments herein, the object is achieved by a method performed by the first network node. The method is for handling at least one of the first configuration for the first measurements and the second configuration for the second measurements to be performed by the wireless device. The wireless device has the first communication with the first network node. The first network node obtains the first indication from the second network node. The second network node has the second communication with the wireless device. The first indication is based on the first result of the determination by the second network node of whether or not to configure the wireless device with the second configuration. The second configuration is to configure the wireless device the second measurement gaps to perform the second measurements on the first carrier. The first result is based on at least one of: i) the first status of the first carrier, and ii) whether or not the wireless device is configured with the first configuration by the first network node. The first configuration is to configure the wireless device with the first measurement gaps to perform the first measurements on the first carrier. The first network node determines whether or not to configure the wireless device with a third configuration. The third configuration is to configure the wireless device with third measurement gaps to perform third measurements on the first carrier. The determining is based on the received first indication. The first network node initiates providing a third indication based on a second result of the determination of whether or not to configure the wireless device with the third configuration to at least one of: a) the second network node and b) the wireless device.

According to a third aspect of embodiments herein, the object is achieved by a method performed by the wireless device. The method is for handling at least one of the first configuration for the first measurements and the second configuration for the second measurements to be performed by the wireless device. The wireless device has the first communication with the first network node. The wireless device obtains the first indication from the second network node having the second communication with the wireless device. The first indication is based on the first result of the determination by the second network node of whether or not to configure the wireless device with the second configuration. The second configuration is to configure the wireless device with the second measurement gaps to perform the second measurements on one of: the first carrier and the second carrier. The first result is based on at least one of: a) the first status of the first carrier, and b) whether or not the wireless device is configured with the first configuration by the first network node. The first configuration is to configure the wireless device with the first measurement gaps to perform the first measurements on the first carrier. The wireless device also obtains the first configuration from the first network node. The wireless device then determines whether or not to configure the wireless device with at least one of: the second configuration and the first configuration. The wireless device in addition initiates configuration of the wireless device based on a third result of the determination of whether or not to configure the wireless device.

According to a fourth aspect of embodiments herein, the object is achieved by the second network node, configured to handle the second configuration for second measurements configured to be performed by the wireless device. The second network node is further configured to determine whether or not to configure the wireless device with the second configuration. The second configuration is to configure the wireless device with the second measurement gaps to perform the second measurements on one of: the first carrier and the second carrier. To determine is configured to be based on at least one of: i) the first status of the first carrier, and ii) whether or not the wireless device is configured with the first configuration by the first network node. The first network node is configured to have the first communication with the wireless device. The first configuration is to configure the wireless device with the first measurement gaps to perform the first measurements on the first carrier. The second network node then initiates providing the first indication based on the first result of the determination to at least one of: a) the first network node and b) the wireless device.

According to a fifth aspect of embodiments herein, the object is achieved by the first network node, configured to handle at least one of the first configuration for the first measurements and the second configuration for the second measurements. The second measurements are configured to be performed by the wireless device, configured to have the first communication with the first network node. The first network node is further configured to obtain the first indication from the second network node, configured to have the second communication with the wireless device. The first indication is configured to be based on the first result of the determination by the second network node of whether or not to configure the wireless device with the second configuration. The second configuration is to configure the wireless device with the second measurement gaps to perform the second measurements on the first carrier. The first result is configured to be based on at least one of: i) the first status of the first carrier, and ii) whether or not the wireless device is configured with the first configuration by the first network node. The first configuration is to configure the wireless device with the first measurement gaps to perform the first measurements on the first carrier. The first network node then determines whether or not to configure the wireless device with the third configuration. The third configuration is to configure the wireless device with the third measurement gaps to perform the third measurements on the first carrier. To determine is configured to be based on the first indication configured to be received. The first network node also initiates providing the third indication configured to be based on the second result of the determination of whether or not to configure the wireless device with the third configuration. The first network node initiates providing the third indication to at least one of: a) the second network node and b) the wireless device.

According to a sixth aspect of embodiments herein, the object is achieved by the wireless device, configured to handle at least one of the first configuration for the first measurements and the second configuration for the second measurements configured to be performed by the wireless device. The wireless device is configured to have the first communication with the first network node. The wireless device is further configured to obtain the first indication from the second network node. The second network node is configured to have the second communication with the wireless device. The first indication is configured to be based on the first result of the determination by the second network node of whether or not to configure the wireless device with the second configuration. The second configuration is to configure the wireless device with the second measurement gaps to perform the second measurements on one of: the first carrier and the second carrier. The first result is configured to be based on at least one of: a) the first status of the first carrier, and b) whether or not the wireless device is configured with the first configuration by the first network node. The first configuration is to configure the wireless device with first measurement gaps to perform the first measurements on the first carrier. The wireless device is also configured to obtain the first configuration from the first network node. The wireless device additionally determines whether or not to configure the wireless device with at least one of: the second configuration and the first configuration. The wireless device also initiates configuration of the wireless device based on the third result of the determination of whether or not to configure the wireless device.

By the second network determining whether or not to configure the wireless device with the second configuration, based on whether or not the wireless device may be already configured with the first configuration by the first network node, the configuration of the wireless device to perform measurements, by either the first network node, which performs similar actions, the second network node, or the wireless device itself is optimized, as the configuration is performed in a coordinated fashion between the nodes. The wireless device will also not waste resources due to excessive or unnecessary gap configuration, since during each gap, the wireless device is not able to transmit or receive on a serving carrier. Consequently, resource utilization is enhanced at the network and in the wireless device, and measurement performance is enhanced. The wireless device is enabled to refrain from performing redundant measurements. Hence, processing and complexity are reduced, as well as power consumption by the wireless device.

These advantages may also be facilitated by the second network node and the first network node exchanging configuration information, as well as the first status of the first carrier.

BRIEF DESCRIPTION OF THE DRAWINGS

Examples of embodiments herein are described in more detail with reference to the accompanying drawings, and according to the following description.

DETAILED DESCRIPTION

As part of the development of embodiments herein, one or more problems with the existing technology will first be identified and discussed.

At least the following problems may be envisioned with the existing technology. First, in multi-connectivity operation, PCell and PSCell may need to configure radio measurements on the same carrier, which may or may not require measurement gaps in different situations. If one node is unaware of the measurements and measurement gaps already configured by the other node, the UE may end up with conflicting information and the measurement procedure may fail or a wrong measurement gap configuration may be used by the UE.

Second, in multi-connectivity operation, PCell and PSCell may configure measurements of different types on the same carrier which may require measurement gaps with different characteristics; currently it is unclear how measurements gaps are used by the UE if such situation occurs.

In order to address these problems, several embodiments are comprised herein. As a summarized overview, embodiments herein may be understood to relate to network nodes coordinating their respective configuration of a wireless device to perform measurements on a certain carrier. Particular embodiments herein may relate to measurement gap coordination in dual connectivity with NR.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 5G and 3GPP LTE has been used in this disclosure to exemplify the embodiments herein, this should not be seen as limiting the scope of the embodiments herein to only the aforementioned system. Other wireless systems with similar characteristics, may also benefit from exploiting the ideas covered within this disclosure.

Figure 1:
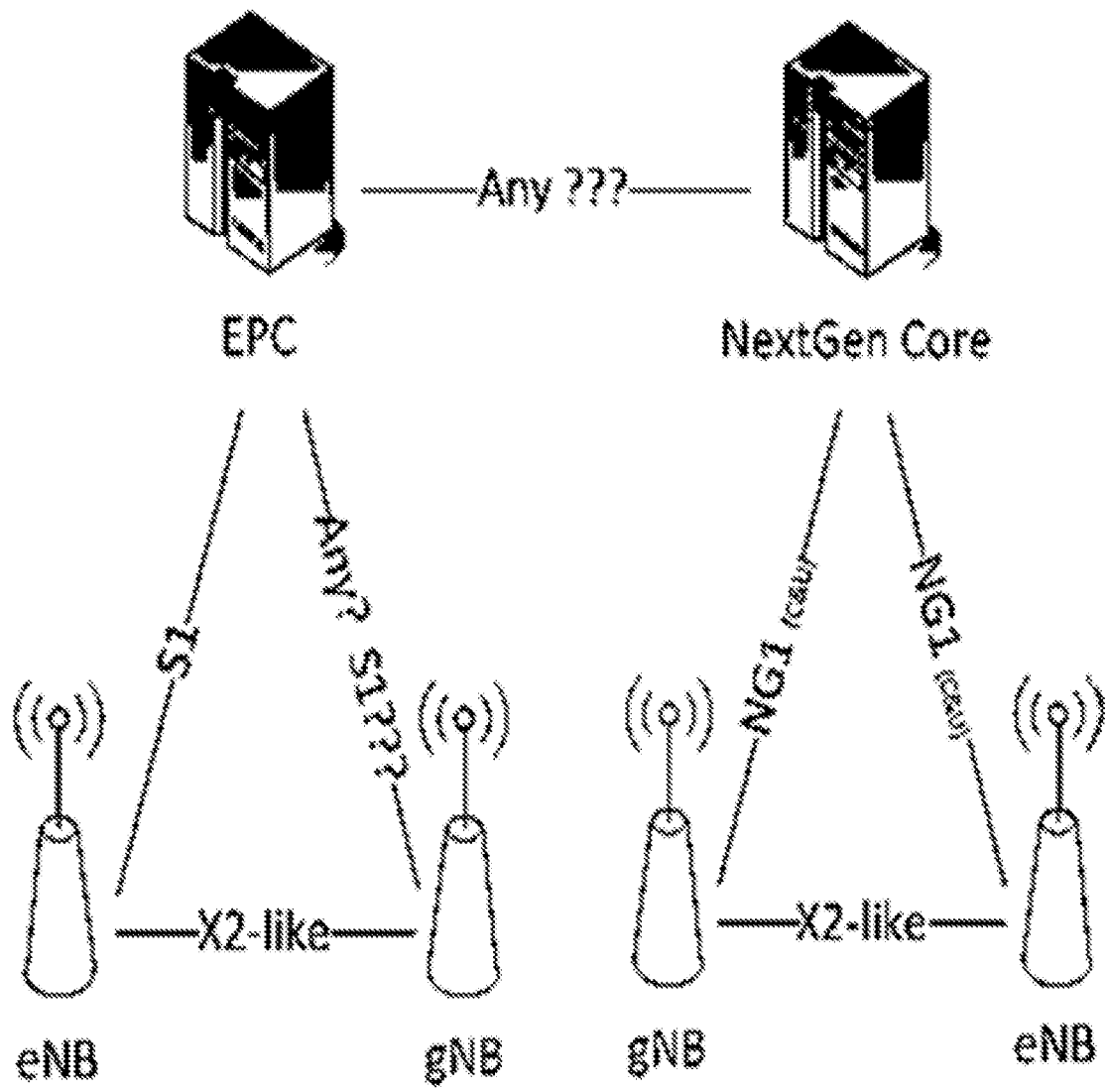
FIG. 1 is a schematic diagram illustrating a non-limiting example of an NR architecture.
Figure 2:
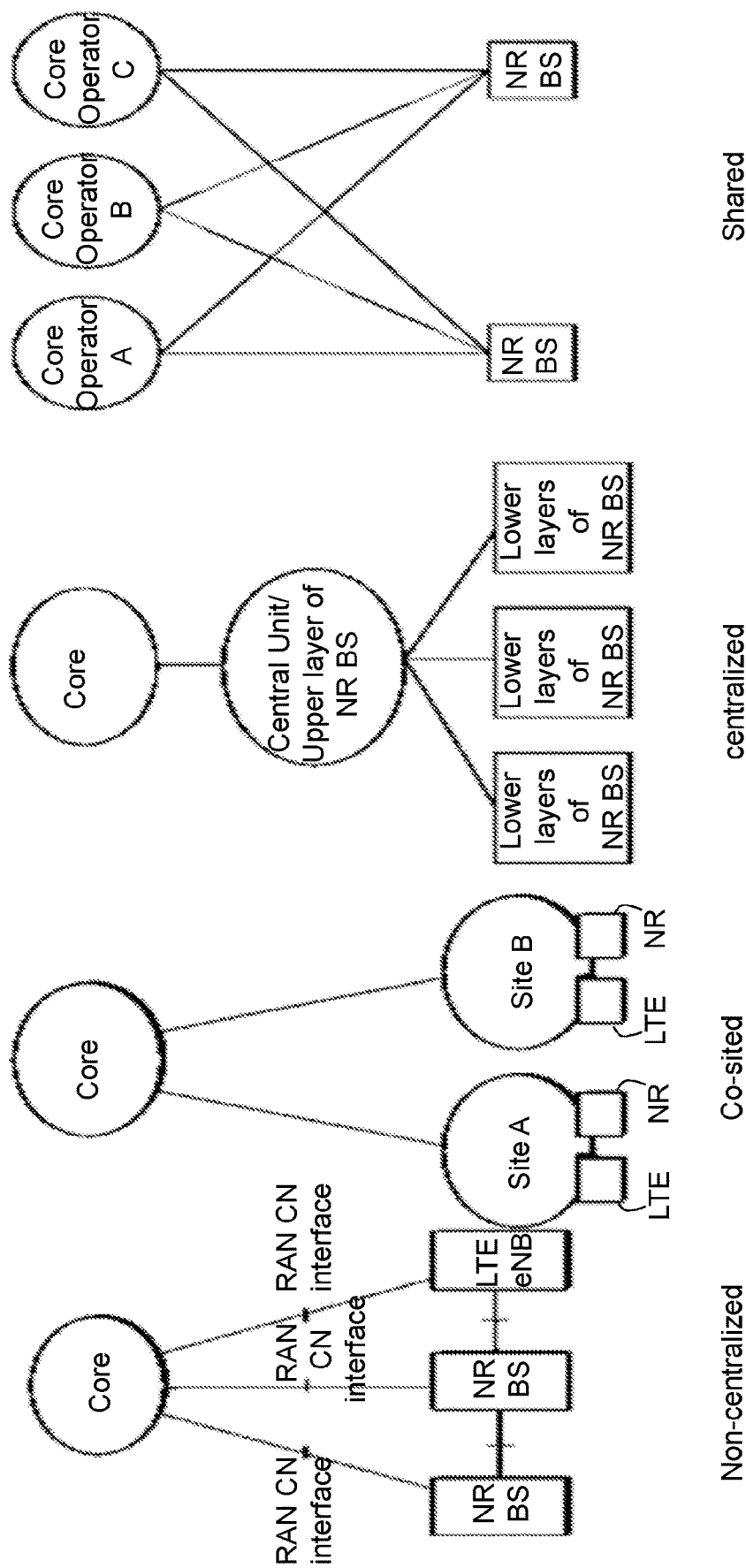
FIG. 2 is a schematic diagram illustrating non-limiting examples of NR deployments.
Figure 3:
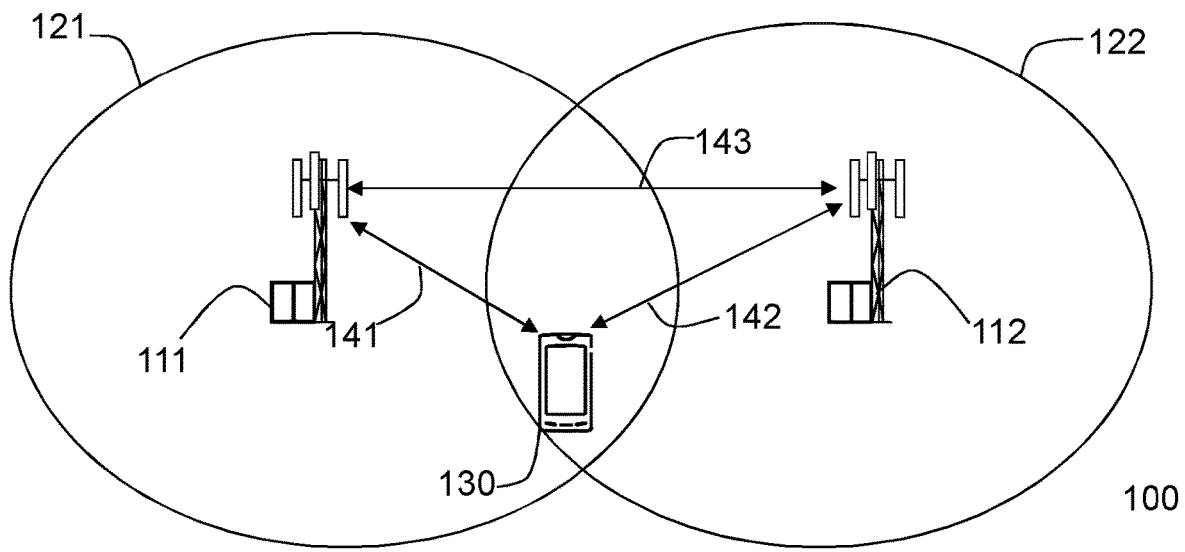
FIG. 3 is a schematic diagram illustrating a wireless communications network, according to embodiments herein.
Figure 3:
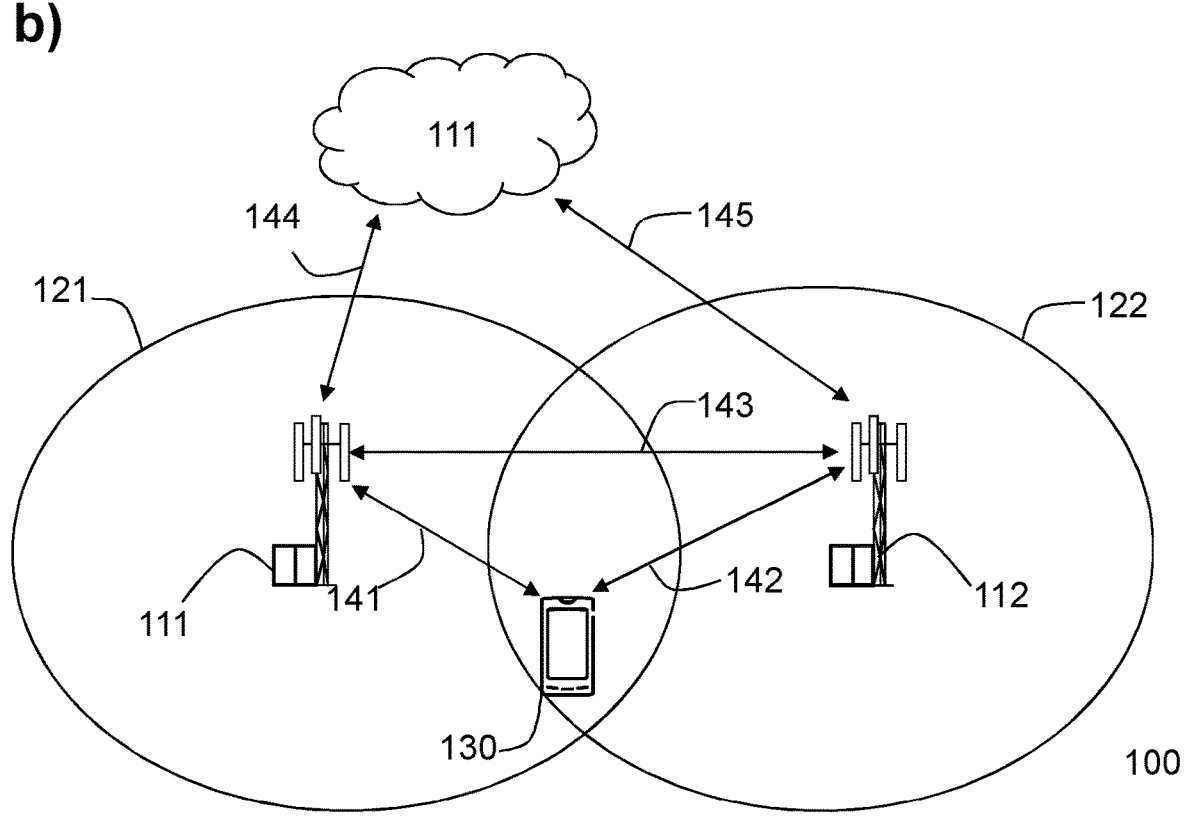

FIG. 3 depicts two non-limiting examples, in FIGS. 3a, and 3b respectively, of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of network nodes, whereof a first network node 111, and a second network node 112 are depicted in the non-limiting examples of FIG. 3. Each of the first network node 111, and the second network node 112 may be radio network nodes. Therefore, any reference herein to a first radio network node may be understood to equally refer to the first network node 111, and any reference herein to a second radio network node may be understood to equally refer to the second network node 112. In a non-limiting scenario, depicted in FIG. 3a and FIG. 3b, the first network node 111 and the second network node 112 may be different nodes. In other examples, the first network node 111 and the second network node 112 may be co-located, or be the same node. In other examples, such as that depicted in FIG. 3b, the first network node 111 may be a distributed node, such as a virtual node in the cloud, and may perform its functions entirely on the cloud, or partially, in collaboration with a radio network node.

Each of the first network node 111, and the second network node 112 may be gNB. That is, a transmission point such as a radio base station, for example an eNB, an eNodeB, or a Home Node B, an Home eNode B or any other network node capable of serving a wireless device, such as a user equipment or a machine type communication device, in the wireless communications network 100. In some examples, at least one of the first network node 111, and the second network node 112 may be a gNB, and the other may be an LTE eNB. The embodiments described herein may be applicable to any multicarrier system wherein at least two radio network nodes may configure radio measurements for the same UE. One specific example scenario comprises a dual connectivity deployment with LTE PCell and NR PSCell. Another example scenario is a dual connectivity deployment with NR PCell and NR PSCell.

The wireless communications network 100 covers a geographical area which may be divided into cell areas, wherein each cell area may be served by a network node, although, one radio network node may serve one or several cells. The wireless communications network 100 comprises at least a first cell 121 and a second cell 122. In the non-limiting example depicted in FIG. 3, the first network node 111 serves the first cell 121, and the second network node 112 serves the second cell 122. Even in examples wherein the wireless communications network 100 may not be referred to as a cellular system, if each of the second network node 112 and the second network node 112 may serve receiving nodes, such as wireless devices, with serving beams, the areas of coverage of the beams may still be referred to as cells. Each of the first network node 111, and the second network node 112 may be of different classes, such as, e.g., macro eNodeB, home eNodeB or pico base station, based on transmission power and thereby also cell size. Each of the first network node 111, and the second network node 112 may support one or several communication technologies, and its name may depend on the technology and terminology used. In 5G/NR, each of the second network node 112 and the second network node 112, which may be referred to as gNBs, may be directly connected to one or more core networks, which are not depicted in FIG. 3.

A plurality of wireless devices is located in the wireless communication network 100, whereof a wireless device 130, is depicted in the non-limiting examples of FIG. 3. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the first network node 111 over a first link 141, e.g., a radio link. The wireless device 130 may be configured to communicate within the wireless communications network 100 with the second network node 112 over a second link 142, e.g., a radio link. The first network node 111 may be configured to communicate within the wireless communications network 100 with the second network node 112 over a third link 143, e.g., a radio link. It may be noted that in the non-limiting examples of FIG. 3a and FIG. 3b, the third link is represented as a direct link. However, it may be noted that the communication between the first network node 111 and the second network node 112 may take place via one or more other radio network nodes or core network nodes. The first network node 111 as a virtual node in the cloud may be configured to communicate within the wireless communications network 100 with the first network node 111 as a radio network node, or third network node, over a fourth link 144, e.g., a radio link or a wired link. The first network node 111 as a virtual node in the cloud may configured to communicate within the wireless communications network 100 with the second network node 112 over a fifth link 145, e.g., a radio link.

In general, the usage of "first", "second", and/or "third", "fourth" and "fifth" herein may be understood to be an arbitrary way to denote different elements or entities, and may be understood to not confer a cumulative or chronological character to the nouns they modify.

Embodiments herein will now be described with some non-limiting examples. In the following description any reference to a/the UE may be understood to relate to the wireless device 130.

Terminology

In some embodiments a non-limiting term "UE" is used. The UE herein may be any type of wireless device capable of communicating with network node or another UE over radio signals. The UE may also be a radio communication device, target device, device to device (D2D) UE, machine type UE or UE capable of machine to machine communication (M2M), a sensor equipped with UE, iPad, Tablet, mobile terminal, smart phone, laptop embedded equipped (LEE), laptop mounted equipment (LME), USB dongles, Customer Premises Equipment (CPE) etc.

Also in some embodiments the generic term "network node" is used. It may be understood to refer to any kind of network node which may comprise a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS, a.k.a. MSR BS, a core network node, e.g., Mobility Management Entity (MME), Self-Optimizing/Organizing Network (SON) node, a coordinating node, positioning node, Minimization of Drive Test (MDT) node, etc., or even an external node, e.g., $3^{rd}$ party node, a node external to the current network, etc. The network node may also comprise a test equipment.

The term "radio node" used herein may be used to denote a UE or a radio network node.

The term "signalling" used herein may comprise any of: high-layer signalling, e.g., via RRC or a like, lower-layer signalling, e.g., via a physical control channel or a broadcast channel, or a combination thereof. The signalling may be implicit or explicit. The signalling may further be unicast, multicast or broadcast. The signalling may also be performed directly to another node, or via a third node.

The term "radio measurement" used herein may refer to any measurement performed on radio signals. The term "measurement", as used herein, may be also understood to equally refer to a radio measurement. Radio measurements may be absolute or relative. A radio measurement may also be referred to as a signal level, which may be a signal quality and/or a signal strength. Radio measurements may be e.g., intra-frequency, inter-frequency, inter-RAT measurements, CA measurements, etc. Radio measurements may be unidirectional, e.g., DL or UL, or bidirectional, e.g., Round-Trip Time (RTT), Reception-Transmission (Rx-Tx), etc. . . . Some examples of radio measurements may be may be timing measurements, e.g., Time of Arrival (TOA), timing advance, RTT, Reference Signal Time Difference (RSTD), Rx-Tx, propagation delay, etc., angle measurements, e.g., angle of arrival, power-based measurements, e.g., Received Signal Power (RSRP), Received Signal Quality (RSRQ), Signal to Interference plus Noise Ratio (SINR), Signal to Noise Ratio (SNR), interference power, total interference plus noise, Received Signal Strength Indicator (RSSI), noise power, etc . . . , cell detection or cell identification, Radio Link Monitoring (RLM), System Information (SI) reading, etc. The inter-frequency and inter-RAT measurements may be carried out by the UE in measurement gaps unless the UE is capable of doing such measurements without gaps.

Examples of measurement gaps are measurement gap id #0, each gap of 6 ms occurring every 40 ms, measurement gap id #1, each gap of 6 ms occurring every 80 ms, etc. The measurement gaps may be configured at the UE by the network node.

Performing a measurement on a carrier may imply performing measurements on signals of one or more cells operating on that carrier or performing measurements on signals of the carrier, a.k.a. carrier specific measurement e.g., RSSI. Examples of cell specific measurements are signal strength, signal quality, etc.

The term measurement performance used herein may refer to any criteria or metric which may characterize the performance of the measurement performed by a radio node. The term measurement performance may be also called measurement requirement, measurement performance requirements, etc. . . . The radio node has to meet one or more measurement performance criteria related to the performed measurement. Examples of measurement performance criteria are measurement time, number of cells to be measured with the measurement time, measurement reporting delay, measurement accuracy, measurement accuracy with respect to a reference value, e.g., ideal measurement result, etc. . . . Examples of measurement time are measurement period, cell identification period, evaluation period, etc.

Synchronization Signal (SS) Block Configuration

Herein we describe a non-limiting example of SS block and SS burst configuration which may be assumed in other embodiments. The signals comprised in an SS block may be used for measurements on an NR carrier, including intra-frequency, inter-frequency and inter-RAT, i.e., NR measurements from another RAT.

SS block: NR-Primary Synchronization Signal (PSS), NR-Secondary Synchronization Signal (SSS) and/or NR-Physical Broadcast Channel (PBCH) may be transmitted within an SS block. For a given frequency band, an SS block may be understood to correspond to N Orthogonal Frequency Division Multiplexing (OFDM) symbols based on the default subcarrier spacing, and N is a constant. UE may be able to identify at least OFDM symbol index, slot index in a radio frame, and radio frame number from an SS block. A single set of possible SS block time locations, e.g., with respect to radio frame or with respect to SS burst set, may be specified per frequency band. At least for the multi-beams case, at least the time index of SS-block may be indicated to the UE. The position(s) of actual transmitted SS-blocks may be informed for helping measurement in CONNECTED/IDLE mode, for helping a UE in CONNECTED mode to receive DL data/control in unused SS-blocks and potentially for helping a UE in IDLE mode to receive DL data/control in unused SS-blocks.

SS burst: One or multiple SS block(s) compose an SS burst. The maximum number of SS-blocks, L, within an SS burst set may be carrier frequency dependent, e.g., for frequency range category #A, e.g., 0~6 GHz, the number (L) is To Be Determined (TBD) within $L \leq [16]$, for frequency range category #B, e.g., 6~60 GHz, the number is TBD within $L \leq [128]$.

SS burst set: One or multiple SS burst(s) further compose an SS burst set, or series, where the number of SS bursts within an SS burst set is finite. From the perspective of the physical layer specification, at least one periodicity of SS burst set is supported. From the UE perspective, SS burst set transmission is periodic. At least for initial cell selection, the UE may assume a default periodicity of SS burst set transmission for a given carrier frequency, e.g., one of 5 ms, 10 ms, 20 ms, 40 ms, 80 ms, or 160 ms. The UE may assume that a given SS block is repeated within a SS burst set periodicity. By default, the UE may neither assume the gNB transmits the same number of physical beam(s), nor the same physical beam(s) across different SS-blocks within an SS burst set.

For each carrier, the SS blocks may be time-aligned or overlap fully or at least in part, or the beginning of the SS blocks may be time-aligned, e.g., when the actual number of transmitted SS blocks is different in different cells.

Figure 4:
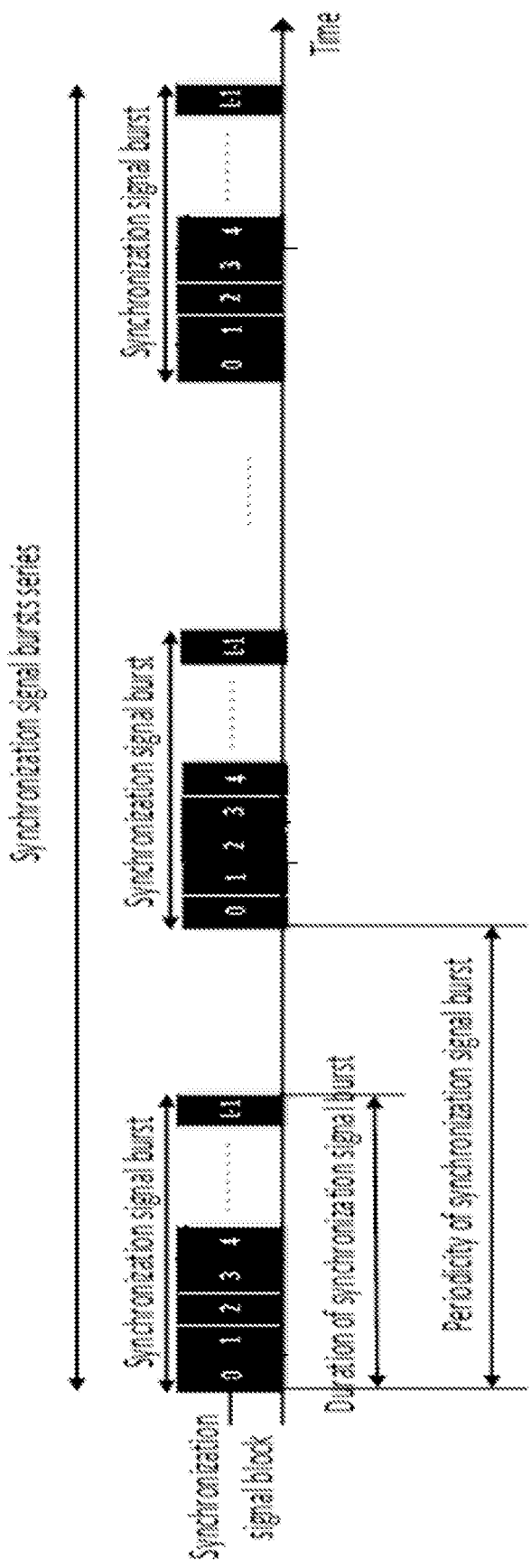
FIG. 4 is a schematic diagram illustrating a non-limiting example configuration of SS blocks, SS bursts and SS burst sets/series.

FIG. 4 is a schematic diagram illustrating a non-limiting example configuration of SS blocks, SS bursts and SS burst sets/series. As schematically depicted in FIG. 4, the synchronization signal series in the illustrated non-limiting example comprises a group of synchronization signal bursts, three of which are shown in FIG. 4. Each of the bursts has a duration of the synchronization signal burst, as indicated by the first arrow under the arrow indicating time. The second arrow under the arrow indicating time indicates the periodicity of the synchronization signal burst.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are: a) embodiments related to a second network node, such as the second network node 112; b) embodiments related to a first network node, such as the first network node 111; and c) embodiments related to a wireless device, such as the wireless device 130, e.g., a UE.

Embodiments herein may be considered to be related to methods for determining the need for measurement gaps when two nodes may configure measurements for a UE such as the wireless device 130. It may therefore be understood that embodiments herein relate to the communication and coordination that may be performed by the two nodes involved, and/or well as by the wireless device 130.

According to some embodiments herein, a first radio network node, such as the first network node 111, and a second radio network node, such as the second network node 112, may configure or may need to configure first radio measurements and second radio measurements, respectively, to be performed by a UE, such as the wireless device 130, on the same carrier frequency or, in some embodiments, on different carrier frequencies, e.g., when measurement gaps may be shared among multiple carriers. The first radio measurements may be referred to herein as first measurements and the second radio measurements may be referred to herein as second measurements. In one example, the first radio network node may be a master node and the second radio network node may be a secondary node. In another example, the second radio network node may be a master node and the first radio network node may be a secondary node. In further examples, the master node may operate on LTE, and the secondary node may operate on NR. In another example, the master node may operate on NR, and the secondary node may operate on LTE. In yet another example, the master and the secondary nodes may operate on NR. In yet another example, at least one of the first and the second radio network nodes may be a multi-standard radio (MSR) network node.

To facilitate the understanding of the embodiments herein, a brief description of the methods performed by each of the first network node 111, the second network node 112 and the wireless device 130 will be presented first, followed by a more detailed description. The method performed by the second network node 112 will be described first.

Embodiments of a method performed by the second network node 112, will now be described with reference to the flowchart depicted in FIG. 5. It may be understood that the method may performed by the second network node 112 in a context wherein the wireless device 130 may, in some instances, already be configured with a "first" configuration to perform the first measurements. The method performed by the second network node 112 is for handling a second configuration for the second measurements to be performed by the wireless device 130. "Second" configuration and "second" measurements are used herein also to facilitate the understanding that they are associated with the second network node 112. The second configuration may comprise a measurement gap configuration or a parameter or parameters controlling how the second measurements are to be performed, e.g., time and/or frequency resources, periodicity, pattern, bandwidth, muting pattern, reference signal, events to trigger measurement reports, etc. It may be understood that the second measurements may comprise one or more measurements.

The wireless device 130 may have a second communication with, or e.g., be served by, the second network node 112. "Second" communication is used herein to facilitate the understanding that it is associated with the second network node 112. The wireless device 130 may have a further first communication with, e.g., may be served by, the first network node 111. The second network node 112, the first network node 111 and the wireless device 130 may be operating in the wireless communications network 100. In some embodiments, at least one of the first network node 111 and the second network node 112 may be an NR network node.

The method performed by the second network node 112 may comprise one or more of the following actions. In some embodiments, all the actions may be performed. In some embodiments, one or more actions may be performed. One or more embodiments may be combined, where applicable. All possible combinations are not described to simplify the description. It should be noted that the examples herein are not mutually exclusive. In FIG. 5, optional actions are indicated with dashed lines. Some actions may be performed in a different order than that shown in FIG. 5.

Action 501

In general terms, according to embodiments herein, the second network node 112 may determine the need to configure the second measurements to be performed by the wireless device 130 on a same carrier frequency or, in some embodiments, on different carrier frequencies as the first network node 111. As stated earlier, the second configuration may comprise a measurement gap configuration or a parameter controlling how the measurement is to be performed. The need for measurement gaps may depend on the carrier status where the second measurements are to be performed. A carrier may be understood herein as a radio frequency that may be used for radio transmission. In some examples, a carrier may refer to frequency resources where a wireless device such as the wireless device 130 may perform measurements, such as an exact frequency location where reference signals to be measured are being transmitted, which may be indicated by a nominal frequency and a bandwidth. The carrier status may comprise whether the carrier is e.g., inter-RAT, inter-frequency, a carrier component or CC, in CA, configured CC, deconfigured CC, activated CC, or CC with activated serving cell, deactivated CC, or CC with deactivated serving cell, one or more configuration parameters, e.g., MGL, MGRP, gap offset, etc. . . . for measurement gaps used for measurements on at least this carrier, one or more configuration parameters, e.g., measurement cycle period, length, offset, etc. . . . which may be considered properties of reference signal(s) that may be transmitted within that carrier, for measurement cycles used for measurements on at least this carrier. The carrier status may be configured or changed by the first network node 111 and/or the second network node 112. Further details on the carrier status are provided in the section entitled "Methods for enabling in one serving node a carrier status information controlled by another serving node".

According to the foregoing, and in order to avoid that the lack of the information in the second network node 112 about carrier(s) status controlled by the first network node 111, or by the wireless device 130, may negatively impact the procedures the former node configures, e.g., measurement configuration, measurement gap configuration, measurement cycle configuration, CA configuration, etc., the second network node 112, in this Action 501, may first obtain information regarding a first status of a first carrier.

Obtaining may comprise, for example, receiving, calculating, determining, or retrieving.

In some embodiments, the information may be obtained from at least one of: the first network node 111, e.g., via the third link, and the wireless device 130, e.g., via the second link.

The information may comprise any information related to e.g., inter-RAT, inter-frequency, carrier component, etc. . . . , as listed above.

By obtaining the information regarding the first status of the first carrier in this Action 501, the second network node 112 is enabled to coordinate the configuration of the wireless device 130 by the first network node 111 and the second network node 112 to perform the measurements.

The obtained carrier status information may then be further used by the second network node 112, e.g., for one or more of the options described in detail under the heading "Methods for determining the need for measurement gaps when two nodes configure measurements for the UE" below.

Action 502

In some embodiments wherein Action 501 has been performed, the second network node 112, may then, in this Action 502, initiate providing the obtained information in Action 501 to at least one of: the first network node 111, and the wireless device 130.

To initiate providing may be understood herein as to start or trigger providing, or to provide itself, e.g., to send, for example, via the third link 143 or the second link 142.

By initiating providing the obtained information in this Action 502, the second network node 112, facilitates the coordination of the configuration of the wireless device 130 by the first network node 111 and the second network node 112, so that both radio network nodes which may be serving the wireless device 130 in dual connectivity are enabled to be aware of the status of different carriers for the wireless device 130.

Action 503

In order to avoid providing conflicting configuration information to the wireless device 130 to perform the second measurements, and/or to avoid failures or errors in the performance of the second measurements, in this Action 503, the second network node 112 determines whether or not to configure the wireless device 130 with the second configuration. The second configuration is to configure the wireless device 130 with second measurement gaps to perform the second measurements on one of: the first carrier and a second carrier. A first carrier frequency of the first carrier may be different than a second carrier frequency of the second carrier.

The determining in this Action 503 is based on at least one of: i) the first status of the first carrier, and ii) whether or not the wireless device 130 is configured with the first configuration by the first network node 111 having the first communication with the wireless device 130. The first configuration is to configure the wireless device 130 with first measurement gaps to perform the first measurements on the first carrier.

In other words, the second network node 112, before configuring the wireless device 130, may determine whether there may be a need for configuring and/or reconfiguring measurement gaps for the second measurements, and whether it may need to configure or reconfigure the wireless device 130. The second network node 112 may perform this determination while accounting for the carrier status that of the carrier may have been already configured for the wireless device 130 by the first network node 111 and/or accounting for the first measurements and/or measurement gaps that may have been already configured by the first radio node 111 for the same wireless device 130.

The first status of the first carrier may be based on the information obtained in Action 501. Similarly, the second network node 112 may know whether or not the wireless device 130 is configured with the first configuration, based on a message or information the second network node 112 may have received from the first network node 111 or another network node, or from the wireless device 130, which in turns may have this information based on the measurement configuration, and/or based on historical information, or a pre-defined rule, e.g., the first carrier is always configured by the second network node 112 a under certain condition, e.g., when another carrier is configured by the first network node 111.

The determination in this Action 503 may enable the coordination between the first network node 111 and the second network node 112 for the performance of the first measurements and the second measurements in a multi-connectivity operation. By performing the determination in this Action 503, the second network node 112 may avoid providing conflicting information to the wireless device 130 for performing the second measurements, and failure of the measurement procedure, or usage of a wrong measurement gap configuration by the wireless device 130 may be avoided. Furthermore, the resource utilization is enhanced, since the second network node 112 may be enabled to configure the gaps for measurements less frequently, if they are determined to not be necessary.

The determining of in this Action 503 may be based on one or more rules, as described in detail under the heading "Methods for determining the need for measurement gaps when two nodes configure measurements for the UE" below. For example, if the second network node 112 determines that the carrier frequency intended for the second measurements is a serving carrier, a.k.a. a carrier component in CA, configured by the first network node 111 for the wireless device 130, then there may be no need for measurement gaps for the second measurements. Alternatively, if the second network node 112 determines that the carrier frequency intended for the second measurements is not a serving carrier configured by the first network node 111, then there may be generally a need for measurement gaps for the second measurements on that carrier. It may further be determined whether there are measurement gaps configured for the first radio measurements on the first carrier frequency which may also be used for performing the second radio measurements on the second carrier frequency, e.g., in case measurement gaps may be common for the first and the second carrier frequencies. In one example, if inter-frequency and inter-RAT measurements are configured for the wireless device 130 on the same carrier, then inter-frequency rules may need to apply for both measurements, e.g., requirements for inter-frequency measurements; or more generally: if measurement type 1 and measurement type 2 are configured on the same carrier, wherein a measurement type is determined by the carrier status, then the most stringent requirements, e.g., shorter measurement period, tighter measurement accuracy, etc. . . . may need to apply for both types.

Action 504

In this Action 504, the second network node 112 initiates providing a first indication based on a first result of the determination, performed in Action 503, to at least one of: a) the first network node 111 and b) the wireless device 130.

Initiating may be understood as starting the performance of, or as causing, enabling or triggering another network node to perform, in this case, the providing. Providing may be understood as e.g., sending. The providing in this Action 504 may be performed over the second link 142 to the wireless device 130, and/or the third link 143 to the first network node 111.

An indication may be understood herein as any of a variable or a value or code, in e.g., a field or a set of one or more bits in a set of time-frequency resources, as applicable depending on the context.

The first indication may for example be an indication of whether the second network node 112 has determined to configure the wireless device 130 with the second configuration or not.

By indicating the result of the determining to the first network node 111, the second network node 112 may then enable the first network node 111 to configure the measurement gaps accordingly, that is, in a coordinated fashion with the second network node 112.

Action 505

In some embodiments, the second network node 112 may, in this Action 505, initiate providing a second indication based on the first result of the determination, performed in Action 503, to at least one of: a) the first network node 111 and b) the wireless device 130. The second indication may indicate at least one of: i) a second status of one or more carriers configured for the wireless device 130, and ii) a parameter related to the second measurements.

The providing in this Action 505 may be performed over the second link 142 to the wireless device 130, and/or the third link 143 to the first network node 111.

The second status may be understood to have a similar description to the first status, but be different from the first status.

The parameter related to the second measurements may be e.g., MGL, MGRP, gap offset, etc. . . . . By providing the second indication to the first network node 111, the second network node 112 may suggest at least one measurement gap configuration parameter, to the first network node 111, which may then be enabled to use the suggested measurement gap configuration parameter for configuring measurement gaps and/or for determining the need for configuring or reconfiguring the measurement gaps for the wireless device 130. By providing the second indication to the wireless device 130, the second network node 112 may configure or reconfigure measurement gaps in the wireless device 130, if needed, for performing at least the second measurements It may be understood that, in some embodiments, the first indication and the second indication may be provided as a same indication.

Any of the actions performed by the second network node 112 may be performed after requesting the wireless device 130 to perform the second measurements on the first carrier.

Embodiments of a method performed by the first network node 111 will now be described with reference to the flowchart depicted in FIG. 6.

The method performed by the first network node 111 may comprise one or more of the following actions. The method is for handling at least one of the first configuration for the first measurements and the second configuration for the second measurements to be performed by the wireless device 130. The wireless device 130 has the first communication with the first network node 111, e.g., may be served by, the first network node 111. The wireless device 130 may have the second communication with, or e.g., be served by, the second network node 112. The first communication may therefore be a further communication. The second network node 112, the first network node 111 and the wireless device 130 may be operating in the wireless communications network 100. As stated earlier, in some embodiments, at least one of the first network node 111 and the second network node 112 may be a NR network node. The first configuration may comprise a measurement gap configuration or a parameter controlling how the measurement is to be performed, e.g., time and/or frequency resources, periodicity, pattern, bandwidth, muting pattern, etc. . . .

In some embodiments, all the actions may be performed. In some embodiments, one or more actions may be performed. One or more embodiments may be combined, where applicable. It should be noted that the examples herein are not mutually exclusive. Components from one example may be tacitly assumed to be present in another example and it will be obvious to a person skilled in the art how those components may be used in the other examples. All possible combinations are not described to simplify the description. In FIG. 6, optional actions are indicated with dashed lines. Some actions may be performed in a different order than that shown in FIG. 6.

The detailed description of some of the following corresponds to the same references provided above, in relation to the actions described for the second network node 112, and will thus not be repeated here to simplify the description. For example, the first carrier frequency of the first carrier may be different than the second carrier frequency of the second carrier.

Action 601

In order to avoid that the lack of the information in the first network node 111 about carrier(s) status controlled by the second network node 112, or by the wireless device 130, may negatively impact the procedures the former node configures, e.g., measurement configuration, measurement gap configuration, measurement cycle configuration, CA configuration, etc., the first network node 111 in this Action 601, may obtain the information regarding the first status of the first carrier.

As described earlier, obtaining may comprise, for example, receiving, calculating, determining, or retrieving.

The information may be obtained from at least one of: the second network node 112, and the wireless device 130. The obtaining in this Action 601 may be performed, for example, by receiving the information over the first link 141 or the third link 143.

Action 602

In order to facilitate the coordination between the first network node 111 and the second network node 112, in this Action 602, the first network node 111, may initiate providing the obtained information in Action 601 to at least one of: the second network node 112, and the wireless device 130.

To initiate providing may be understood herein as to start or trigger providing, or providing, e.g., sending, for example, via the third link 143 or the first link 141.

By initiating providing the obtained information in this Action 602, the second network node 112, facilitates the coordination of the configuration of the wireless device 130 by the first network node 111 and the second network node 112, so that both radio network nodes which may be serving the wireless device 130 in dual connectivity are enabled to be aware of the status of different carriers for the wireless device 130.

The obtained carrier status information may then be further used by the first network node 111, e.g., for one or more of the options described in detail under the heading "Methods for determining the need for measurement gaps when two nodes configure measurements for the UE" below.

Action 603

In this Action 603, the first network node 111 obtains the first indication from the second network node 112 having the second communication with the wireless device 130. The first indication is based on the first result of the determination by the second network node 112, according to Action 503, of whether or not to configure the wireless device 130 with the second configuration. The second configuration is to configure the wireless device 130 with the second measurement gaps to perform the second measurements on the first carrier. The first result, as described earlier in relation to the second network node 112, is based on at least one of: i) the first status of the first carrier, and ii) whether or not the wireless device 130 is configured with the first configuration by the first network node 111. The first configuration is to configure the wireless device 130 with first measurement gaps to perform the first measurements on the first carrier.

The obtaining in this Action 603 may be performed over the third link 143, from the second network node 112.

By obtaining the first indication from the second network node 112, the first network node 111 may then be enabled to configure measurement gaps accordingly, e.g., for other measurements. Therefore, the coordination between the first network node 111 and the second network node 112 is enabled.

Action 604

The first network node 111 may, in this Action 604, may receive the second indication from the second network node 112, as described earlier. The second indication may be based on the first result. The second indication may indicate at least one of: i) the second status of the one or more carriers configured for the wireless device 130, and ii) the parameter related to the second measurements. In other words, the first network node 111 may be informed on the second configuration, as determined by the second network node 112, so the first network node 111 may take it into account in a further configuration, that is, a third configuration, of the wireless device 130 to perform further measurements, e.g., third measurements.

The receiving in this Action 604 may be performed over the first link 141 from the wireless device 130, and/or the third link 143, from the second network node 112.

Action 605

In this Action 605, the first network node 111 determines whether or not to configure the wireless device 130 with the third configuration. The third configuration is to configure the wireless device 130 with third measurement gaps to perform the third measurements on the first carrier. The determining 605 is based on the received first indication.

In other words, in this Action 605, the first network node 111, may need to decide whether, based on the determination performed by the second network node 112, which in turn may be based on the first configuration previously performed by the first network node 111, whether to configure the wireless device 130 with a further, that is, another configuration. The determining in this Action 605 may be performed in a similar way as that described above in Action 503.

In some embodiments, the third configuration may be the same as the first configuration, and the third measurements may be the same as the first measurements. That is, the characteristics of the first measurements and the third measurements may be the same, and the characteristics of the first configuration and the third configuration may be the same.

The determination in this Action 605 may enable the coordination between the first network node 111 and the second network node 112 for the performance of the third measurements in a multi-connectivity operation. By performing the determination in this Action 605, the first network node 111 may avoid providing conflicting information to the wireless device 130 for performing the third measurements, and failure of the measurement procedure, or usage of a wrong measurement gap configuration by the wireless device 130 may be avoided. Furthermore, the resource utilization is enhanced, since the first network node 111 may be enabled to configure the gaps for measurements less frequently, if they are determined to not be necessary.

Action 606

In this Action 606, the first network node 111 initiates providing a third indication based on a second result of the determination, as performed in Action 605, of whether or not to configure the wireless device 130 with the third configuration to at least one of: a) the second network node 112, and b) the wireless device 130.

The providing in this Action 606 may be performed over the first link 141 to the wireless device 130, and/or the third link 143 to the second network node 112.

The third indication may for example be an indication of whether the first network node 111 is to configure the wireless device 130 with the third configuration or not. The third indication may be understood to be another indication, e.g., different from the first indication and the second indication.

By indicating the result of the determining to the second network node 112, the first network node 111 may then enable the second network node 112 to configure measurement gaps accordingly for further measurements.

Any of the actions performed by the first network node 111 may be performed after requesting the wireless device to perform the first measurements on the first carrier.

Embodiments of a method performed by the wireless device 130, will now be described with reference to the flowchart depicted in FIG. 7. The method may be for handling at least one of the first configuration for the first measurements and the second configuration for the second measurements to be performed by the wireless device 130. The wireless device 130 has the first communication with the first network node 111, e.g., may be served by, the first network node 111. The wireless device 130 may have the second communication with, or e.g., be served by, the second network node 112. The first communication may be a further communication. The second network node 112, the first network node 111 and the wireless device 130 may be operating in the wireless communications network 100.

The method performed by the wireless device 130 may comprise one or more of the following actions. In some embodiments all the actions may be performed. In some embodiments, one or more actions may be performed. One or more embodiments may be combined, where applicable. It should be noted that the examples herein are not mutually exclusive. Components from one example may be tacitly assumed to be present in another example and it will be obvious to a person skilled in the art how those components may be used in the other examples. All possible combinations are not described to simplify the description. In FIG. 7, optional actions are indicated with dashed lines. Some actions may be performed in a different order than that shown in FIG. 7.

The detailed description of some of the following corresponds to the same references provided above, in relation to the actions described for the second network node 112, and will thus not be repeated here to simplify the description. For example, at least one of the first network node 111 and the second network node 112 may be a NR network node.

Any of the actions performed by the wireless device 130 may be performed after receiving a request from the first network node 111 to perform the first measurements on the first carrier, and/or receiving a request from the second network node 112 to perform the second measurements on the first carrier, or on the second carrier. As stated earlier, the first carrier frequency of the first carrier may be different than the second carrier frequency of the second carrier.

Action 701

In order to perform measurements taking into account the configurations respectively provided the first network node 111 and the second network node 112, the wireless device 130 in this Action 701 may obtain the information regarding the first status of the first carrier.

As described earlier, obtaining may comprise, for example, receiving, calculating, determining, or retrieving.

The information may be obtained from at least one of: the first network node 111, and the second network node 112. The obtaining in this Action 701 may be performed, for example, by receiving the information over the first link 141 or the second link 142.

Action 702

In this Action 702, the wireless device 130 may initiate providing the obtained information in Action 701 to at least one of: the first network node 111, and the second network node 112.

To initiate providing may be understood herein as to start or trigger providing, or providing, e.g., sending, for example, via the first link 141 or the second link 142.

By initiating providing the obtained information in this Action 702, the wireless device 130, facilitates the coordination of the configuration of the wireless device 130 by the first network node 111 and the second network node 112. It may be understood that if the wireless device 130 obtains the information in Action 701 from the first network node 111, it may then initiate providing it to the second network node 112 in this Action 702, and vice versa.

Action 703

In this Action 703, the wireless device 130 obtains both, the first indication from the second network node 112, and the first configuration from the first network node 111. The second network node 112 has the second communication with the wireless device 130. The first indication is based on the first result of the determination, as performed in the Action 503, by the second network node 112, of whether or not to configure the wireless device 130 with the second configuration. The second configuration is to configure the wireless device 130 with second measurement gaps to perform the second measurements on one of: the first carrier and the second carrier. The first result is based on at least one of: a) the first status of the first carrier, and b) whether or not the wireless device 130 is configured with the first configuration by the first network node 111. The first configuration is to configure the wireless device 130 with the first measurement gaps to perform the first measurements on the first carrier.

The obtaining in this Action 703 may be performed over the first link 141, from the first network node 111, and/or the second link 142, from the second network node 112.

By obtaining the first indication from the second network node 112, and the first configuration from the first network node 111, the wireless device 130 may then be enabled to configure measurement gaps accordingly. Therefore, usage by the wireless device 130 of the configurations provided by the first network node 111 and the second network node 112 in coordination is enabled.

Action 704

The wireless device 130 may, in this Action 704, receive the second indication from at least one of: the second network node 112 and the first network node 111. The second indication may be based on the first result. The second indication may indicate at least one of: i) the second status of the one or more carriers configured for the wireless device 130, and ii) the parameter related to the second measurements.

The receiving in this Action 704 may be performed over the first link 141, from the first network node 111, and/or the second link 142, from the second network node 112.

Action 705

In this Action 705, the wireless device 130 determines whether or not to configure the wireless device 130 with at least one of: the second configuration and the first configuration. In other words, in this Action 705, the wireless device 130, which may have already been configured by the first network node 111 with the first configuration, may decide, based on the determination performed by the second network node 112, whether to configure the wireless device 130 with the second configuration, or whether to continue to use the first configuration.

In some examples, the wireless device 130 may determine whether or not to configure the wireless device 130 with at least one of: the second configuration and the third configuration.

The determining in this Action 705 may be performed in a similar way as that described above in Action 503.

The determination in this Action 705 of whether or not to configure the wireless device 130 may be further based on the first status of the first carrier.

The determination in this Action 705 may enable the wireless device 130 to configure the measurement gaps taking into account the configurations received from both, the first network node 111 and the second network node 112 in a multi-connectivity operation. By performing the determination in this Action 705, the wireless device 130 may be enabled to resolve itself conflicting information it may have received from the first network node 111 and the second network node 112 for performing the second measurements, and avoid failure of the measurement procedure, or usage of a wrong measurement gap configuration. The wireless device 130, is therefore enabled to not perform, that is to refrain from performing, redundant measurements in a multi-connectivity scenario, where the wireless device 130 may have received requests to perform measurements on the same carrier by the first network node 111 and the second network node 112. Moreover, power consumption, processing, and complexity is reduced.

Action 706

In this Action 706, the wireless device 130 initiates configuration of the wireless device 130 based on a third result of the determination performed in Action 705 of whether or not to configure the wireless device 130.

Action 707

In this Action 707, the wireless device 130, may initiate providing a fourth indication based on the third result of the determination to at least one of: a) the first network node 111 and b) the second network node 112.

To initiate providing may be understood herein as to start or trigger providing, or providing, e.g., sending, for example, via the first link 141 or the second link 142.

By initiating providing the obtained information in this Action 707, the wireless device 130 may inform the first network node 111 and/or the second network node 112 of the configuration it has determined to perform, and thereby the wireless device 130, facilitates the coordination of the configuration of the wireless device 130 by the first network node 111 and the second network node 112.

An illustrative overview of embodiments herein, in more general terms, as well as with particular examples will now be provided. In the following description, any reference to a/the first radio network node or Node1 may be understood to equally refer to the first network node 111, any reference to a/the second radio network node, or a/the second node, or Node2 may be understood to equally refer to the second network node 112, and any reference to a/the UE may be understood to equally refer to the wireless device 130. Any reference to first radio measurements may be understood to equally refer to the first measurements, and any reference to second radio measurements may be understood to equally refer to the second measurements. The expression (re)configure or (re)configuring may be understood to comprise configuring or reconfiguring.

Methods for Determining the Need for Measurement Gaps when Two Nodes Configure Measurements for the UE According to some embodiments herein, a first radio network node and a second radio network node may configure or may need to configure first radio measurements and second radio measurements, respectively, to be performed by a UE on the same carrier frequency or in some embodiments on different carrier frequencies, e.g., when measurement gaps can be shared among multiple carriers. In one example, the first radio network node is a master node and the second radio network node is a secondary node. In another example, the second radio network node is a master node and the first radio network node is a secondary node. In further examples, the master node operates on LTE, and the secondary node operates on NR. In another example, the master node operates on NR, and the secondary node operates on LTE. In yet another example, the master and the secondary nodes operate on NR. In yet another example, at least one of the first and the second radio network nodes is a multi-standard radio (MSR) network node.

The embodiments herein describe how the need for measurement gaps for performing measurements on the relevant carrier frequency may be determined and how the measurements gaps may be configured. The determining of the measurement gaps need may be triggered, e.g., by a need to configure new first and/or second measurements or by a cell change in the UE, wherein a cell change may comprise any of: handover, PCell or PCC change, PSCell or PSCC change, adding a new CC, releasing a CC, activating or deactivating a CC. The need for measurement gaps may depend on the carrier status where the first and the second measurements are to be performed, wherein the carrier status may be configured or changed by the first and/or the second radio network node. The carrier status, see also the section entitled "Methods for enabling in one serving node a carrier status information controlled by another serving node", may comprise e.g., inter-RAT, inter-frequency, carrier component, in CA, configured CC, deconfigured CC, activated CC, or CC with activated serving cell, deactivated CC, or CC with deactivated serving cell.

The following more specific scenarios may be considered. It may be noted that in the description below of the embodiments, the first and the second radio network nodes may also exchange places. This may be understood to mean that each of the first radio network node and the second radio network node may exchange information and perform determinations based on the exchanged information in a similar manner. Therefore, what is described for one radio network node may equally apply to the other radio network node.

According to Action 503, the second radio network may determine whether there may be a need for (re)configuring measurement gaps for the second measurements it may need to configure or reconfigure for a UE, while accounting for the carrier status configured for the UE by the first radio network node, and/or accounting for the first measurements and/or measurement gaps configured by the first radio network node for the same UE. The determining of the need may be understood to be performed in the second radio network node. The second radio network node may then perform one or more of the following actions:

According to Action 504, the second radio network node may indicate the result of the determining to the first radio network node, which may then configure measurement gaps accordingly.

According to Action 505, the second radio network node may, upon determining the need, suggest at least one measurement gap configuration parameter, e.g., MGL, MGRP, gap offset, etc., to the first radio network node, which may then use the suggested configure measurement gap configuration parameter for configuring measurement gaps.

Also according to Action 505, the second radio network node may, (re)configure measurement gaps in the UE, if needed, for performing at least the second measurements.

The (re)configured measurement gaps may further be indicated to the first radio network node by the second radio network node or by the UE receiving the (re)configured measurement gaps.

Also in accordance with Action 505, the second radio network node may indicate to the first radio network node the status of one or more carriers configured for a UE and/or at least one parameter related to configuration of the second measurements, e.g., carrier frequency, measurement periodicity, measurement pattern, measurement bandwidth, number of measurement samples needed or the time needed to perform the measurement, at least one measurement gap configuration parameter suitable for the second measurements, etc., and the first radio network node may then, according to Action 605, determine the need for configuring or reconfiguring the measurement gaps for the UE for performing at least the third measurements, based on the received parameter, and (re)configure the measurement gaps upon the determined need. In this case, the determining of the need may be understood to be performed by the first radio network node.

The first radio network node may, according to Action 606, further indicate to the second radio network node whether and which measurement gap configuration was then actually configured for the UE for performing at least the third measurements.

The first and the second radio network node may independently configure the first and the second measurements, respectively, and measurement gaps, if needed, only for the corresponding first or second measurements respectively, while the UE, according to Action 705, may determine whether and which measurement gap configuration to use. In this case, the determining of the need may be understood to be performed by the UE.

Also in accordance with Action 503, the determining may also account for the status of the carrier on which the first and the second measurements are to be performed.

The UE may then, according to Action 707, indicate to one or both of the first and second radio network nodes the result of the determining which may also comprise the measurement gap configuration used by the UE.

The first and the second radio network node may be in the same physical node, e.g., a multi-standard radio node; there still may be an interface between the first and the second node, may be co-located, co-sited, or non-collocated.

One of the first radio measurements and the second radio measurements may comprise inter-RAT measurements, and the other may comprise inter-frequency measurements. In another example, both the first and the second radio measurements may comprise inter-frequency measurements, e.g., when the first and the second radio network nodes operate the same RAT.

The need for (re)configuring measurement gaps may be determined, in a relevant node, according to Action 503, Action 605, Action 705, e.g., based on one or more rules below. It may be noted that in the description of the embodiments below, the terms "the first" and "the second", e.g., the first radio network node and the second radio network node, may be also exchanged.

If it is determined that the carrier frequency intended for the second radio measurements, configured by the second radio network node, is a serving carrier, a.k.a., carrier component in CA, configured by the first radio network node for the same UE, then there may be no need for measurement gaps for the second measurements.

In this case, intra-frequency or serving carrier requirements may need to apply for the first and the second radio measurements.

When, according to Action 705, such determining is done in the UE which, in accordance with Action 704, may receive, e.g., from the second radio network node, a measurement gap configuration for the second measurements on that carrier frequency, the UE may ignore this measurement gap configuration.

If it is determined that the carrier frequency intended for the second radio measurements is not a serving carrier configured by the first radio network node, then there may generally be a need for measurement gaps for first radio measurements on that carrier.

It may further be determined whether there are measurement gaps configured for the first radio measurements on the first carrier frequency which may also be used for performing the second radio measurements on the second carrier frequency, e.g., in case measurement gaps may be common for the first and the second carrier frequencies. The first and the second carrier frequencies may or may not be the same in different examples.

It may further be determined which measurement gaps may need to apply, e.g., measurement gaps for inter-frequency measurements, e.g., configured by the second radio network node, or inter-RAT measurements, e.g., configured by the first radio network node.

In one example, if inter-frequency and inter-RAT measurements are configured for the same UE on the same carrier, then inter-frequency rules may need to apply for both measurements, e.g., requirements for inter-frequency measurements; or more generally: if measurement type 1 and measurement type 2 are configured on the same carrier, wherein a measurement type is determined by the carrier status, then the most stringent requirements, e.g., shorter measurement period, tighter measurement accuracy, etc. . . . may need to apply for both types.

In a further example, the UE may even use the same measurement samples to perform the inter-frequency and inter-RAT measurements on the same carrier, which means that, in these particular examples, the inter-RAT measurements and the inter-frequency measurements will have the same performance characteristics and may be able to meet the same requirements, e.g., measurement period and/or accuracy.

The rule above may also apply even when inter-frequency and inter-RAT measurements are configured on different carrier frequencies for the same UE, e.g., when measurement gaps may be shared for the two carrier frequencies.

It may further be determined whether there are already first measurements and/or measurement gaps configured by the first radio network node and/or performed by the UE on the relevant carrier frequencies and if so, whether the measurement gaps configured/used for the first radio measurements are sufficient also for the second radio measurements.

If it is determined that the measurement gap is not sufficient, it may further be determined a measurement gap configuration adapted for the first and the second radio measurements, wherein in some examples the adaptation may comprise one or more of the following options.

According to a first option, the adaptation may comprise configuring a measurement gap pattern which enables a pre-defined or configured, e.g., by one of the nodes, measurement gap sharing, e.g., 75% of measurement gaps may be used for the first radio measurements, and 25% of measurement gaps may be used for the second radio measurements.

The sharing may apply when the measurement samples for the first and the second measurements cannot be the same or need to be performed at different times, at different periodicities, according to different patterns, in different measurement occasions, and/or on different signals/channels—this may happen when the first and second measurements are performed on the same or different first and second carrier frequencies.

It may be noted that, when the same measurement samples can be used for the first and the second measurements configured on the same carrier, then measurement gaps may be commonly used, e.g., 100% of gaps may be used for the first measurements and 100% of gaps may be used for the second measurements.

According to a second option, the adaptation may comprise aligning measurement gaps with all or a certain amount of measurement occasions of the first radio measurements. The measurement occasions of the first radio measurements may be indicated by a pattern and/or may appear with some periodicity.

According to a third option, the adaptation may comprise aligning measurement gaps with all or a certain amount of measurement occasions of the second radio measurements.

According to a fourth option, a first MGL may be configured when both the first and the second radio measurements are configured on the same carrier, otherwise a second MGL may also be used.

According to a fifth option, a first MGRP may be configured when both the first and the second radio measurements are configured on the same carrier, otherwise a second MGRP may also be used.

Other options may also be possible.

If the second node transmits also signals/channels for the first and/or second radio measurements, the second node may adapt or (re)configure a signal or channel transmission configuration used for the first measurements and/or second measurements to enable a sufficient number of samples for both measurements within a single measurement gap pattern on the carrier, e.g., select the time units, transmission duration within a single measurement occasion, periodicity, SS blocks, and/or signal/channel type for the second measurements so that they fall in the measurement gaps already configured for the first measurements.

As described above, in some embodiments, the determining of whether and which measurement gaps may be needed may be based on a message received from another node. For example, when the determining is in a network node, the message may be received from another network node or a UE, such as the first indication received in Action 603, or the information regarding the first status of the first carrier as obtained in Action 501, and when the determining is in a UE, the determining may be based on messages from one or more serving nodes, such as the first indication received in Action 703 or the information regarding the first status of the first carrier as obtained in Action 701. In general, such message may comprise, e.g., a UE measurement configuration, the set of carriers on which the UE is configured by a node to perform any measurements or measurements of a certain type, e.g., CA measurements, inter-frequency measurements, inter-RAT measurements, etc., the set of inter-frequency carriers on which the UE is configured by the node to perform measurements, the set of inter-RAT carriers on which the UE is configured by the node to perform measurements, the set of carrier components configured for the UE by the node, carrier status information, see also the section entitled "Methods for enabling in one serving node a carrier status information controlled by another serving node", an indication on whether and which measurement gaps, e.g., one measurement gap characteristic such as MGL, MGRP, or gap offset with respect to a reference time such as a certain SFN, are configured for the UE by a node.

The embodiments herein may be further elaborated with a few specific examples.

In one specific example, in Evolved Universal Terrestrial Radio Access New Radio Dual Carrier (E-UTRA-NR DC) operation, it may be assumed that an LTE eNB requests the UE to perform first measurements on a first NR carrier (F1). It may also be assumed that the UE is also configured with F1 as serving carrier belonging to an SCG which is managed by a gNB, i.e., an NR BS. In this case, the eNB does not configure the UE with measurement gaps for doing measurements on F1.

In another specific example, in E-UTRA-NR DC operation, it may be assumed that an LTE eNB requests the UE to perform inter-RAT measurements on a first NR carrier (F1). It may also be assumed that the UE is configured with F1 as PSC belonging to SCG, which is managed by a gNB, i.e., an NR BS. In this case, the eNB does not configure the UE with measurement gaps for doing measurements on F1.

In yet another specific example in E-UTRA-NR DC operation, it may be assumed that an LTE eNB requests the UE to perform inter-RAT measurements on a first NR carrier (F1). It may also be assumed that the UE is configured with F1 as SCC belonging to a SCG which is managed by a gNB, i.e., an NR BS. In this case, the eNB does not configure the UE with measurement gaps for doing measurements on F1.

In yet another specific example in E-UTRA-NR DC operation, it may be assumed that an LTE eNB requests the UE to perform inter-RAT measurements on a first NR carrier (F1). It may also be assumed that the UE is configured F1 for doing inter-frequency measurements on F1 by a gNB, i.e., NR BS. In this case, the eNB does not configure the UE with measurement gaps for doing measurements on F1.

In yet another specific example in E-UTRA-NR DC operation, it may be assumed that an LTE eNB requests the UE to perform first measurements on a first NR carrier (F1). It may also be assumed that the UE is not configured by a gNB to do any measurements on F1. In this case, the eNB configures the UE with measurement gaps for doing measurements on F1.

In yet another specific example of E-UTRA-NR DC operation, or NR-E-UTRA DC operation, according to a rule, the UE may be required to perform measurements on an inter-RAT carrier requested by a PCell, in an MCG, without measurement gaps provided that this inter-RAT carrier is a reference carrier in another cell group, e.g., an SCG. An example of the reference carrier is PSC in SCG, etc. . . .

Methods for Enabling in One Serving Node a Carrier Status Information Controlled by Another Serving Node In DC with NR, each of master node and secondary node may configure other serving cells or CCs. The lack of the information in one node about carrier(s) status controlled by another node may negatively impact the procedures the former node configures, e.g., measurement configuration, measurement gap configuration, measurement cycle configuration, CA configuration, etc.

Therefore, according to some examples of embodiments herein, a first radio network node may obtain the carrier status information for a given one or more UE for one or more carriers controlled by a second radio network node for the UE. The obtaining may be, e.g., periodic, upon a request from the first radio network node, upon a triggering condition or event, or upon a carrier status change or update configured by the second radio network node. The request may also comprise the carriers or carrier range or frequency band of the interest.

The carrier status information may comprise e.g., inter-RAT, inter-frequency, a carrier component or CC, in CA, configured CC, deconfigured CC, activated CC, or CC with activated serving cell, deactivated CC, or CC with deactivated serving cell, one or more configuration parameters, e.g., MGL, MGRP, gap offset, etc. . . . for measurement gaps used for measurements on at least this carrier, one or more configuration parameters, e.g., measurement cycle period, length, offset, etc. . . . for measurement cycles used for measurements on at least this carrier.

Note also that configuring measurement cycles applicable for a carrier may be understood to mean that the carrier is a deactivated CC, configuring measurement gaps applicable for a carrier implicitly may be understood to mean that the carrier is inter-RAT or inter-frequency; there may also be measurement gap configurations specific for a specific RAT or inter-RAT and inter-frequency carriers in general.

In one example, the first radio network node is a master node and the second radio network node is a secondary node. In another example, the second radio network node is a master node and the first radio network node is a secondary node. In further examples, the master node operates on LTE, and the secondary node operates on NR. In another example, the master node operates on NR, and the secondary node operates on LTE. In yet another example, the master and the secondary nodes operate on NR. In yet another example, at least one of the first and the second radio network nodes is a multi-standard radio (MSR) network node.

The obtaining of the carrier status, e.g., according to Action 501, Action 601, and/or Action 701 may be based, e.g., on one or more of: a message received from the second radio network node, via a direct interface or via another node, an explicit or implicit indication received from the second radio network node, via a direct interface or via another node, a message or indication received from the UE, and/or an explicit or implicit indication received from the UE.

In one specific example, a PSCell, e.g., the second radio network node, may provide, according to Action 502, to a PCell, e.g., the first radio network node, the carrier status information for one or more CCs which are under its control for a UE served by the PSCell and the PCell. The carrier status information may be provided upon changing the status of one or more carriers or upon a request from the PCell.

In another example, a PCell, e.g., the second radio network node, may provide, according to Action 502, to a PSCell, e.g., the first radio network node, the carrier status information for one or more CCs which are under its control for a UE served by the PSCell and the PCell. The carrier status information may be provided upon changing the status of one or more carriers or upon a request from the PSCell.

The obtained carrier status information, e.g., according to Action 601, may then be further used by the first radio network node, e.g., for one or more of the following options.

According to a first option, the first radio network node may use the obtained carrier status information for configuring measurements on a carrier with the obtained status.

According to a second option, the first radio network node may use the obtained carrier status information for (re)configuring measurement gaps on a carrier with the obtained status.

According to a third option, the first radio network node may use the obtained carrier status information for (re)configuring a specific type of measurement gaps based on a carrier with the obtained status. For example, if the carrier configured by the second network node is deactivated, then the first network node may configure the UE with a particular type of measurement gap; otherwise, the first network node may configure any type of measurement gap. The UE may perform measurements on cells of a carrier with a deactivated SCell, typically once every SCell measurement cycle. The SCell measurement cycle may be configured by the network node. An example of a particular type of measurement gap is the one whose periodicity is an integral multiple of a measurement cycle. Another example of a particular type of measurement gap is the one whose gap length is smaller than a threshold, e.g., 4 ms or smaller.

According to a fourth option, the first radio network node may use the obtained carrier status information for adapting a resource allocation for receiving the measurement results from the UE based on the obtained status of the carrier. For example, if the carrier configured by the second network node is deactivated, then the first network node may expect the UE to perform the measurements over a longer time period, compared to the case when the carrier is activated. Due to the carrier being a deactivated carrier, the first network node allocates the UE with the uplink resources for reporting the measurement results based on the expected reported delay.

According to a fifth option, the first radio network node may use the obtained carrier status information for (re)configuring measurement cycles on a carrier with the obtained status.

According to a sixth option, the first radio network node may use the obtained carrier status information for configuring CCs for the UE, e.g., not configuring as CC or deconfiguring CC on carriers used as CCs by the second radio network node.

According to a seventh option, the first radio network node may use the obtained carrier status information for (re)configuring one or more transmissions or SS blocks in one or more beams or cells under the control of the first radio network node, e.g., use a first transmission configuration if the carrier status in the second radio network node is X, otherwise use a second transmission configuration. In one example, the transmissions may be on the carrier for which the status was obtained from the second radio network node, or in another example, the transmissions may be on a different carrier than whose status was obtained, e.g., the first radio network node may transmit a signal/channel on a first carrier to be received by a UE if there is no carrier with configured and/or activated CC for the same UE based on the carrier status provided by the second radio network node, otherwise it may not transmit the signal/channel.

According to an eighth option, the first radio network node may use the obtained carrier status information for changing the status of one or more cells and/or carriers by the first radio network node, e.g., configuring as SCC if it has not been configured as SCC by the second radio network node.

According to a ninth option, the first radio network node may use the obtained carrier status information for controlling, e.g., allowing to add or forcing to deconfigure or deactivate some CCs, that the total number of all CCs and/or CCs of a certain type and/or in a certain RAT configured for the UE by all nodes does not exceed the corresponding threshold, e.g., UE capability.

According to a tenth option, the first radio network node may use the obtained carrier status information for controlling a CC configuration to ensure that CCs configured and/or activated by the first and/or the second radio network node for the same UE satisfy a certain condition, e.g., CCs of the same node are in the same band, CCs of the same node are in different bands, CCs of the same node are not separated in frequency by more than a threshold or contiguous in frequency.

More examples may be found in the section entitled "Methods for determining the need for measurement gaps when two nodes configure measurements for the UE".

Embodiments herein may be particularly applicable in E-UTRAN-NR DC or NR-E-UTRAN DC operations, where the UE may be requested by an LTE eNB and an NR gNB to perform measurements on the same or different carrier frequencies.

According to a first example, a first network node, e.g., Node1, may request a UE to perform first measurements on a carrier frequency (F1), and manage measurement gap configuration as follows. The first network node: a) does not configure the UE with measurement gaps, or deconfigures or reconfigures gaps if they already exist, provided that the UE is also configured by a second network node (Node2) with the same carrier frequency (F1) for performing second measurements, or b) configures the UE with measurement gaps if the UE is not configured by Node2 with F1 for performing any measurements. The first network node may receive the results of the first measurements performed by the UE on F1 from the UE. The first network node may determine whether or not the UE is configured with F1 by the second network node for performing any measurements based on one or more of the following means: by receiving information from Node2 or from another network node, by receiving information from the UE, which in turns has this information based on the measurement configuration, and/or based on historical information or a pre-defined rule, e.g., F1 is always configured by Node2 under certain condition, e.g., when another carrier F2 is configured by Node1.

Figure 8:
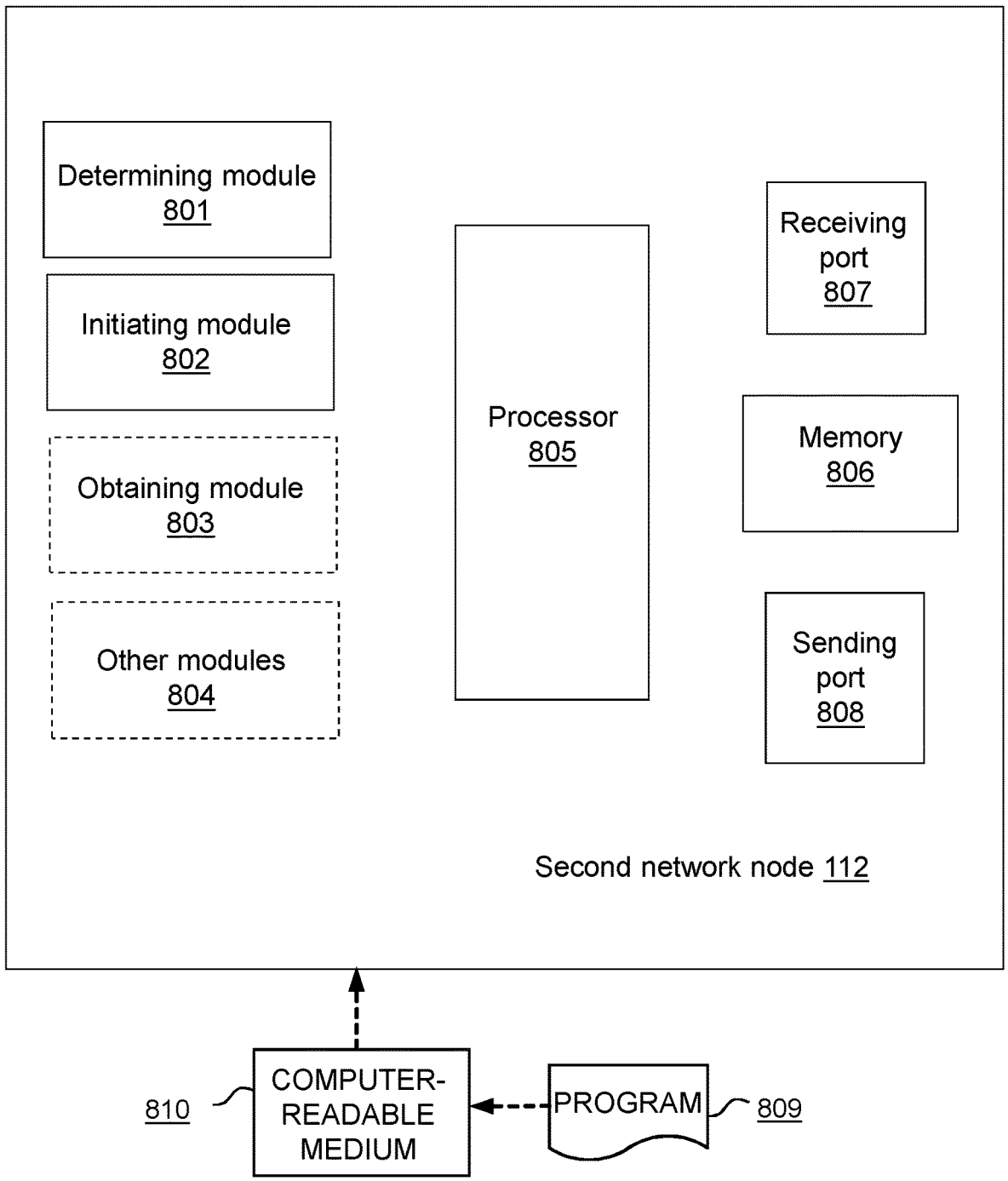
FIG. 8 is a schematic block diagram illustrating embodiments of a second network node, according to embodiments herein.

To perform the method actions described above in relation to FIG. 5, the second network node 112 may comprise the following arrangement depicted in FIG. 8. The second network node 112 is configured to handle the second configuration for the second measurements configured to be performed by the wireless device 130.

It should be noted that the examples herein are not mutually exclusive. Components from one example may be tacitly assumed to be present in another example and it will be obvious to a person skilled in the art how those components may be used in the other examples. In FIG. 8, optional modules are indicated with dashed boxes.

The detailed description of some of the following corresponds to the same references provided above, in relation to the actions described for the second network node 112, and will thus not be repeated here. For example, the first carrier frequency of the first carrier is configured to be different than the second carrier frequency of the second carrier.

The second network node 112 may be configured to, e.g. by means of a determining module 801 within the second network node 112 configured to, determine whether or not to configure the wireless device 130 with the second configuration. The second configuration is to configure the wireless device 130 with the second measurement gaps to perform the second measurements on one of: the first carrier and the second carrier. To determine is configured to be based on at least one of: i) the first status of the first carrier, and ii) whether or not the wireless device 130 is configured with the first configuration by the first network node 111 being configured to have the first communication with the wireless device 130. The first configuration is to configure the wireless device 130 with the first measurement gaps to perform the first measurements on the first carrier. The determining module 801 may be a processor 805 of the second network node 112, or an application running on such processor.

The second network node 112 is also configured to, e.g. by means of an initiating module 802 within the second network node 112 configured to, initiate providing the first indication based on the first result of the determination to at least one of: a) the first network node 111 and b) the wireless device 130. The initiating module 802 may be the processor 805 of the second network node 112, or an application running on such processor.

In some embodiments, the second network node 112 may be configured to, e.g. by means of the initiating module 802 within the second network node 112, configured to, initiate providing the second indication based on the first result of the determination to at least one of: a) the first network node 111 and b) the wireless device 130. The second indication may be configured to indicate at least one of: i) the second status of the one or more carriers configured for the wireless device 130, and ii) the parameter related to the second measurements.

In some embodiments, at least one of the first network node 111 and the second network node 112 may be a NR network node.

In some embodiments, the second network node 112 may be configured to, e.g. by means of an obtaining module 803 within the second network node 112 configured to, obtain information regarding the first status of the first carrier. The obtaining module 803 may be the processor 805 of the second network node 112, or an application running on such processor.

The information may be configured to be obtained from at least one of: the first network node 111, and the wireless device 130.

In some embodiments, the second network node 112 may be configured to, e.g. by means of the initiating module 802 within the second network node 112 configured to, initiate providing the information configured to be obtained to at least one of: the first network node 111, and the wireless device 130. The obtaining module 803 may be the processor 805 of the second network node 112, or an application running on such processor.

Other modules 804 may be comprised in the second network node 112.

The embodiments herein may be implemented through one or more processors, such as a processor 805 in the second network node 112 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 806 comprising one or more memory units. The memory 806 is arranged to be used to store obtained information, store data, configurations, schedulings, and applications etc. to perform the methods herein when being executed in the second network node 112.

In some embodiments, the second network node 112 may receive information from the first network node 111 and/or the wireless device 130, through a receiving port 807. In some embodiments, the receiving port 807 may be, for example, connected to one or more antennas in second network node 112. In other embodiments, the second network node 112 may receive information from another structure in the wireless communications network 100 through the receiving port 807. Since the receiving port 807 may be in communication with the processor 805, the receiving port 807 may then send the received information to the processor 805. The receiving port 807 may also be configured to receive other information.

The processor 805 in the second network node 112 may be further configured to transmit or send information to e.g., the first network node 111, and/or the wireless device 130, through a sending port 808, which may be in communication with the processor 805, and the memory 806.

Those skilled in the art will also appreciate that the determining module 801, the initiating module 802, the obtaining module 803, and the other modules 804 described above may refer to a combination of analog and digital modules, and/or one or more processors configured with software and/or firmware, e.g., stored in memory, that, when executed by the one or more processors such as the processor 805, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 801-804 described above may be implemented as one or more applications running on one or more processors such as the processor 805.

Thus, the methods according to the embodiments described herein for the second network node 112 may be respectively implemented by means of a computer program 809 product, comprising instructions, i.e., software code portions, which, when executed on at least one processor 805, cause the at least one processor 805 to carry out the actions described herein, as performed by the second network node 112. The computer program 809 product may be stored on a computer-readable storage medium 810. The computer-readable storage medium 810, having stored thereon the computer program 809, may comprise instructions which, when executed on at least one processor 805, cause the at least one processor 805 to carry out the actions described herein, as performed by the second network node 112. In some embodiments, the computer-readable storage medium 810 may be a non-transitory computer-readable storage medium, such as a CD ROM disc, a memory stick, or stored in the cloud space. In other embodiments, the computer program 809 product may be stored on a carrier containing the computer program, wherein the carrier is one of an electronic signal, optical signal, radio signal, or the computer-readable storage medium 810, as described above.

The second network node 112 may comprise an interface unit to facilitate communications between the second network node 112 and other nodes or devices, e.g., the first network node 111, the wireless device 130, or any of the other nodes. In some particular examples, the interface may, for example, include a transceiver configured to transmit and receive radio signals over an air interface in accordance with a suitable standard.

Figure 9:
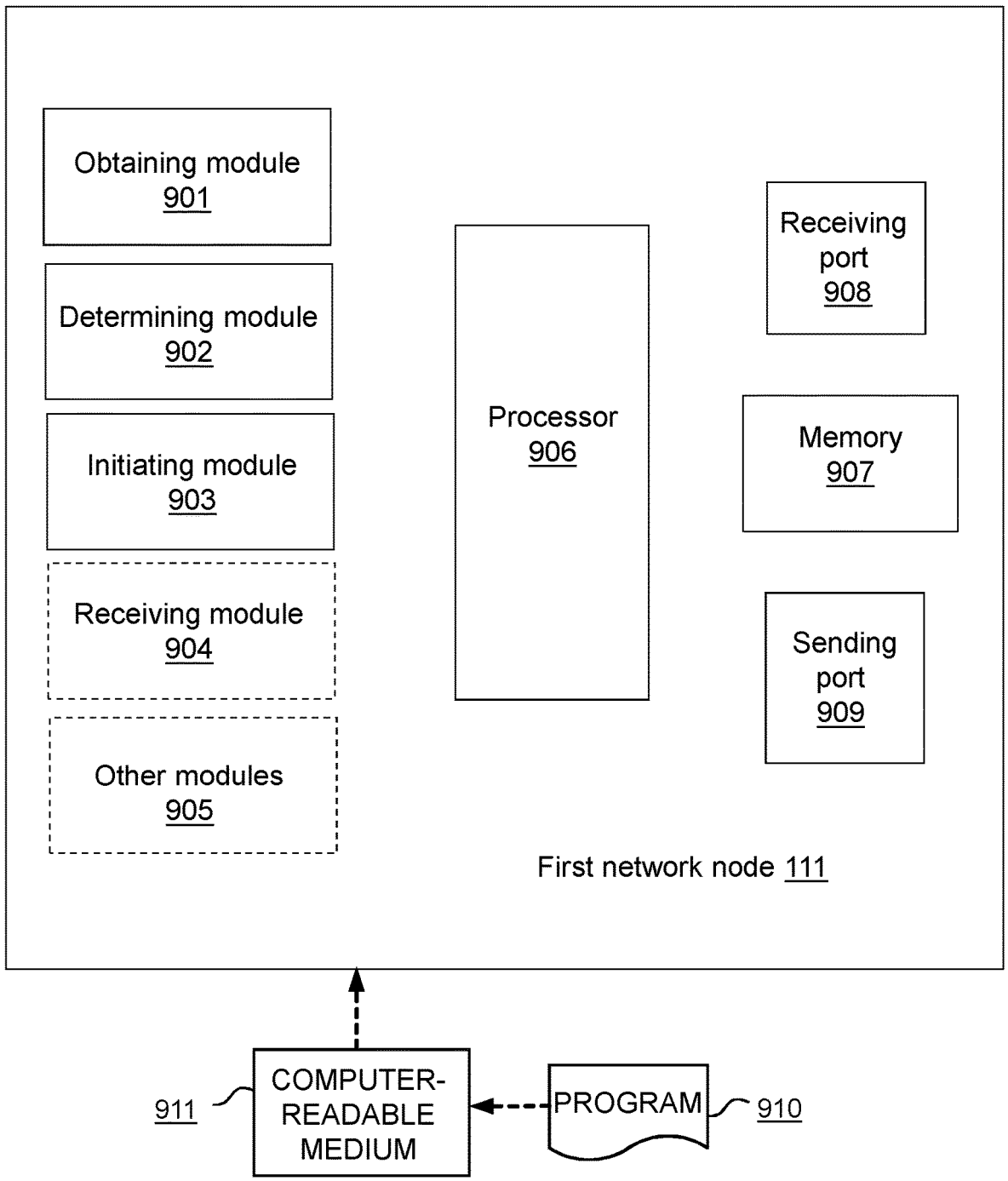
FIG. 9 is a schematic block diagram illustrating embodiments of a first network node, according to embodiments herein.

To perform the method actions described above in relation to FIG. 6, the first network node 111 may comprise the following arrangement depicted in FIG. 9. The first network node 111 is configured to handle at least one of the first configuration for first measurements and the second configuration for second measurements configured to be performed by the wireless device 130 configured to have the first communication with the first network node 111.

It should be noted that the examples herein are not mutually exclusive. Components from one example may be tacitly assumed to be present in another example and it will be obvious to a person skilled in the art how those components may be used in the other examples. In FIG. 9, optional modules are indicated with dashed boxes.

The detailed description of some of the following corresponds to the same references provided above, in relation to the actions described for the first network node 111, and will thus not be repeated here. For example, the first carrier frequency of the first carrier may be configured to be different than the second carrier frequency of the second carrier.

The first network node 111 may be configured to, e.g. by means of an obtaining module 901 within the first network node 111 configured to, obtain the first indication from the second network node 112 configured to have the second communication with the wireless device 130. The first indication is configured to be based on the first result of the determination by the second network node 112 of whether or not to configure the wireless device 130 with the second configuration. The second configuration is to configure the wireless device 130 with second measurement gaps to perform the second measurements on the first carrier. The first result is configured to be based on at least one of: i) the first status of the first carrier, and ii) whether or not the wireless device 130 is configured with the first configuration by the first network node 111. The first configuration is to configure the wireless device 130 with first measurement gaps to perform the first measurements on the first carrier. The obtaining module 901 may be a processor 906 of the first network node 111, or an application running on such processor.

The first network node 111 may be configured to perform, e.g. by means of a determining module 902 within the first network node 111 configured to, determine whether or not to configure the wireless device 130 with the third configuration. The third configuration is to configure the wireless device 130 with the third measurement gaps to perform third measurements on the first carrier. To determine is configured to be based on the first indication configured to be received. The determining module 902 may be the processor 906 of the first network node 111, or an application running on such processor.

The first network node 111 is also configured to, e.g. by means of an initiating module 903 within the first network node 111 configured to, initiate providing the third indication configured to be based on the second result of the determination of whether or not to configure the wireless device 130 with the third configuration to at least one of: a) the second network node 112 and b) the wireless device 130. The initiating module 903 may be the processor 906 of the first network node 111, or an application running on such processor.

In some embodiments, the first network node 111 may be configured to, e.g. by means of the obtaining module 901 within the first network node 111 configured to, obtain information regarding the first status of the first carrier. The obtaining module 901 may be the processor 906 of the first network node 111, or an application running on such processor.

The information may be configured to be obtained from at least one of: the second network node 112, and the wireless device 130.

The first network node 111 may be configured to, e.g. by means of the initiating module 903 within the first network node 111 configured to, initiate providing the information configured to be obtained to at least one of: the second network node 112, and the wireless device 130. The initiating module 903 may be the processor 906 of the first network node 111, or an application running on such processor.

In some embodiments, the first network node 111 may be configured to, e.g. by means of a receiving module 904 within the first network node 111 configured to, receive the second indication from the second network node 112. The second indication may be configured to be based on the first result. The second indication may be further configured to indicate at least one of: i) the second status of the one or more carriers configured for the wireless device 130, and ii)

the parameter related to the second measurements. The receiving module 904 may be the processor 906 of the first network node 111, or an application running on such processor.

In some embodiments, at least one of the first network node 111 and the second network node 112 may be a NR network node.

Other modules 905 may be comprised in the first network node 111.

The embodiments herein may be implemented through one or more processors, such as a processor 906 in the first network node 111 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 907 comprising one or more memory units. The memory 907 is arranged to be used to store obtained information, store data, configurations, schedulings, and applications etc. to perform the methods herein when being executed in the first network node 111.

In some embodiments, the first network node 111 may receive information from the second network node 112, and/or the wireless device 130, through a receiving port 908. In some embodiments, the receiving port 908 may be, for example, connected to one or more antennas in first network node 111. In other embodiments, the first network node 111 may receive information from another structure in the wireless communications network 100 through the receiving port 908. Since the receiving port 908 may be in communication with the processor 906, the receiving port 908 may then send the received information to the processor 906. The receiving port 908 may also be configured to receive other information.

The processor 906 in the first network node 111 may be further configured to transmit or send information to e.g., the second network node 112, and/or the wireless device 130, through a sending port 909, which may be in communication with the processor 906, and the memory 907.

Those skilled in the art will also appreciate that the obtaining module 901, the determining module 902, the initiating module 903, the receiving module 904 and the other modules 905 described above may refer to a combination of analog and digital modules, and/or one or more processors configured with software and/or firmware, e.g., stored in memory, that, when executed by the one or more processors such as the processor 906, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 901-905 described above may be implemented as one or more applications running on one or more processors such as the processor 906.

Thus, the methods according to the embodiments described herein for the first network node 111 may be respectively implemented by means of a computer program 910 product, comprising instructions, i.e., software code portions, which, when executed on at least one processor 906, cause the at least one processor 906 to carry out the actions described herein, as performed by the first network node 111. The computer program 910 product may be stored on a computer-readable storage medium 911. The computer-readable storage medium 911, having stored thereon the computer program 910, may comprise instructions which, when executed on at least one processor 906, cause the at least one processor 906 to carry out the actions described herein, as performed by the first network node 111. In some embodiments, the computer-readable storage medium 911 may be a non-transitory computer-readable storage medium, such as a CD ROM disc, a memory stick, or stored in the cloud space. In other embodiments, the computer program 910 product may be stored on a carrier containing the computer program, wherein the carrier is one of an electronic signal, optical signal, radio signal, or the computer-readable storage medium 911, as described above.

The first network node 111 may comprise an interface unit to facilitate communications between the first network node 111 and other nodes or devices, e.g., the second network node 112, the wireless device 130, or any of the other nodes. In some particular examples, the interface may, for example, include a transceiver configured to transmit and receive radio signals over an air interface in accordance with a suitable standard.

Figure 10:
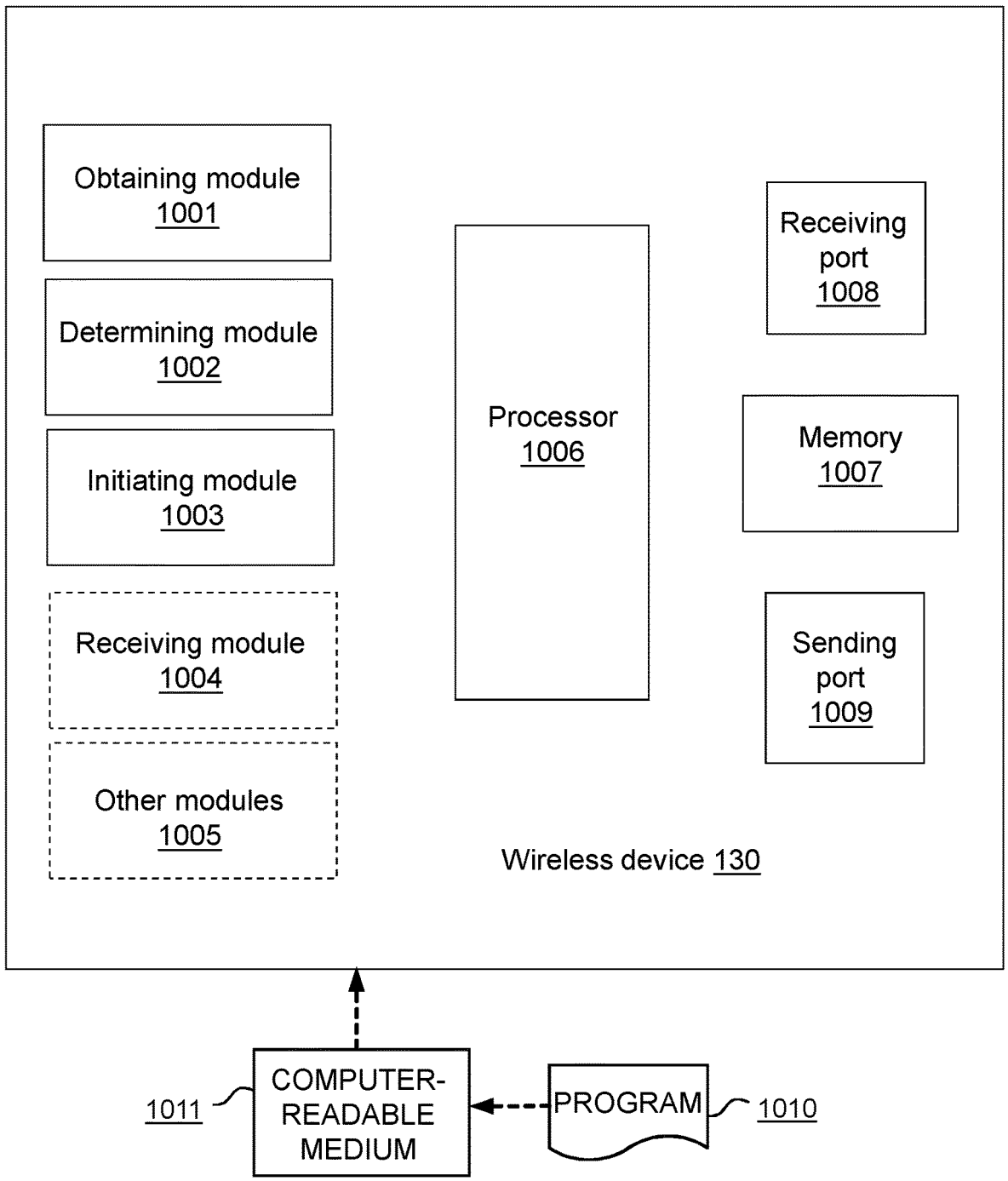
FIG. 10 is a schematic block diagram illustrating embodiments of a wireless device, according to embodiments herein.

To perform the method actions described above in relation to FIG. 7, the wireless device 130 may comprise the following arrangement depicted in FIG. 10. The wireless device 130 is configured to handle at least one of the first configuration for first measurements and the second configuration for the second measurements configured to be performed by the wireless device 130. The wireless device 130 is configured to have the first communication with the first network node 111.

It should be noted that the examples herein are not mutually exclusive. Components from one example may be tacitly assumed to be present in another example and it will be obvious to a person skilled in the art how those components may be used in the other examples. In FIG. 10, optional modules are indicated with dashed boxes.

The detailed description of some of the following corresponds to the same references provided above, in relation to the actions described for the first network node 111, and will thus not be repeated here. For example, the first carrier frequency of the first carrier may be configured to be different than the second carrier frequency of the second carrier.

The wireless device 130 may be configured to, e.g. by means of an obtaining module 1001 within the wireless device 130 configured to, obtain: i) the first indication from the second network node 112 being configured to have the second communication with the wireless device 130. The first indication is configured to be based on the first result of the determination by the second network node 112 of whether or not to configure the wireless device 130 with the second configuration. The second configuration is to configure the wireless device 130 with the second measurement gaps to perform the second measurements on one of: the first carrier and the second carrier. The first result is configured to be based on at least one of: a) the first status of the first carrier, and b) whether or not the wireless device 130 is configured with the first configuration by the first network node 111. The first configuration is to configure the wireless device 130 with the first measurement gaps to perform the first measurements on the first carrier. The wireless device 130 is further configured to obtain iii) the first configuration from the first network node 111. The obtaining module 801 may be a processor 1006 of the wireless device 130, or an application running on such processor.

The wireless device 130 is configured to, e.g. by means of a determining module 1002 within the wireless device 130 configured to, determine whether or not to configure the wireless device 130 with at least one of: the second configuration and the first configuration. The determining module 1002 may be the processor 1006 of the wireless device 130, or an application running on such processor.

The wireless device 130 is configured to, e.g. by means of an initiating module 1003 within the wireless device 130 configured to, initiate configuration of the wireless device 130 based on the third result of the determination 705 of whether or not to configure the wireless device 130. The initiating module 1003 may be the processor 1006 of the wireless device 130, or an application running on such processor.

In some embodiments, the determination of whether or not to configure the wireless device 130 may be further configured to be based on the first status of the first carrier.

In some embodiments, the wireless device 130 may be configured to, e.g. by means of the initiating module 1003 configured to, initiate providing the fourth indication based on the third result of the determination to at least one of: a) the first network node 111 and b) the second network node 112.

In some embodiments, the wireless device 130 may be configured to, e.g. by means of a receiving module 704 within the wireless device 130 configured to, receive the second indication from at least one of: the second network node 112 and the first network node 111. The second indication is configured to be based on the first result. The second indication is configured to indicate at least one of: i) the second status of the one or more carriers configured for the wireless device 130, and ii) the parameter related to the second measurements. The receiving module 704 may be the processor 1006 of the wireless device 130, or an application running on such processor.

In some embodiments, the wireless device 130 may be configured to, e.g. by means of the obtaining module 1001 within the wireless device 130 configured to, obtain information regarding the first status of the first carrier. The obtaining module 1001 may be the processor 1006 of the wireless device 130, or an application running on such processor.

The information may be configured to be obtained from at least one of: the first network node 111, and the second network node 112.

The wireless device 130 may be configured to, e.g. by means of the initiating module 1003 configured to, initiate providing the information configured to be obtained to at least one of: the first network node 111, and the second network node 112.

At least one of the first network node 111 and the second network node 112 may be a NR network node.

Other modules 1005 may be comprised in the wireless device 130.

The embodiments herein may be implemented through one or more processors, such as a processor 1006 in the wireless device 130 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 1007 comprising one or more memory units. The memory 1007 is arranged to be used to store obtained information, store data, configurations, schedulings, and applications etc. to perform the methods herein when being executed in the wireless device 130.

In some embodiments, the wireless device 130 may receive information from the first network node 111, and/or the second network node 112, through a receiving port 1008. In some embodiments, the receiving port 1008 may be, for example, connected to one or more antennas in wireless device 130. In other embodiments, the wireless device 130 may receive information from another structure in the wireless communications network 100 through the receiving port 1008. Since the receiving port 1008 may be in communication with the processor 1006, the receiving port 1008 may then send the received information to the processor 1006. The receiving port 1008 may also be configured to receive other information.

The processor 1006 in the wireless device 130 may be further configured to transmit or send information to e.g., the first network node 111, and/or the second network node 112, through a sending port 1009, which may be in communication with the processor 1006, and the memory 1007.

Those skilled in the art will also appreciate that the obtaining module 1001, the determining module 1002, the initiating module 1003, the receiving module 1004 and the other modules 1005 described above may refer to a combination of analog and digital modules, and/or one or more processors configured with software and/or firmware, e.g., stored in memory, that, when executed by the one or more processors such as the processor 1006, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1001-1005 described above may be implemented as one or more applications running on one or more processors such as the processor 1006.

Thus, the methods according to the embodiments described herein for the wireless device 130 may be respectively implemented by means of a computer program 1010 product, comprising instructions, i.e., software code portions, which, when executed on at least one processor 1006, cause the at least one processor 1006 to carry out the actions described herein, as performed by the wireless device 130. The computer program 1010 product may be stored on a computer-readable storage medium 1011. The computer-readable storage medium 1011, having stored thereon the computer program 1010, may comprise instructions which, when executed on at least one processor 1006, cause the at least one processor 1006 to carry out the actions described herein, as performed by the wireless device 130. In some embodiments, the computer-readable storage medium 1011 may be a non-transitory computer-readable storage medium, such as a CD ROM disc, a memory stick, or stored in the cloud space. In other embodiments, the computer program

1010 product may be stored on a carrier containing the computer program, wherein the carrier is one of an electronic signal, optical signal, radio signal, or the computer-readable storage medium 1011, as described above.

The wireless device 130 may comprise an interface unit to facilitate communications between the wireless device 130 and other nodes or devices, e.g., the first network node 111, the second network node 112, or any of the other nodes. In some particular examples, the interface may, for example, include a transceiver configured to transmit and receive radio signals over an air interface in accordance with a suitable standard.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Figure 5:
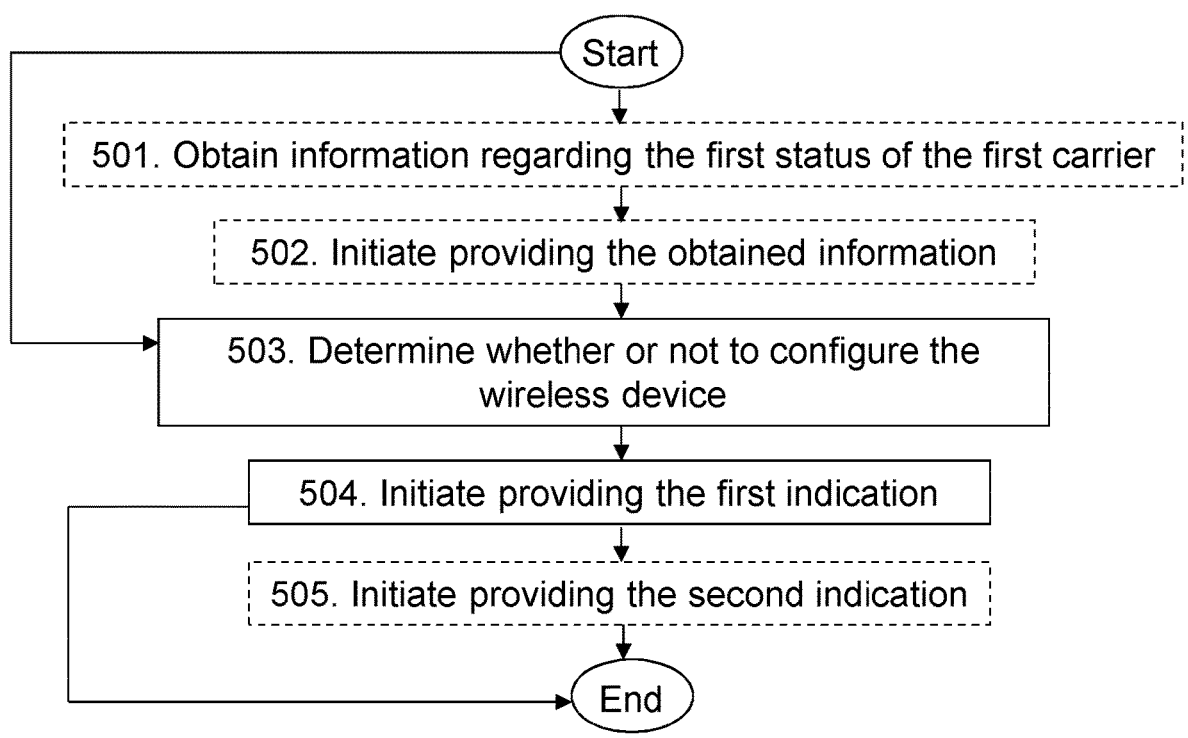
FIG. 5 is a flowchart depicting a method in a second network node, according to embodiments herein.

Further Examples Related to Embodiments Herein:

The second network node 112 examples relate to FIG. 5 and FIG. 8.

A method performed by the second network node 112 may comprise one or more of the following actions. The method may be for handling at least a second configuration for second measurements to be performed by the wireless device 130.

In some embodiments all the actions may be performed. In some embodiments, one or more actions may be performed. One or more embodiments may be combined, where applicable.

Determining 503 whether or not to configure the wireless device 130. The determining 501 may comprise determining whether or not to configure or reconfigure the wireless device 130 with a second configuration. The second configuration may be to configure the wireless device 130 with second measurement gaps to perform second measurements on one of: a first carrier and a second carrier. The determining 503 may be based on at least one of:
  i. a first status of the first carrier, and
  ii. whether or not the wireless device 130 is configured with a first configuration by the first network node 111; the first configuration may be to configure the wireless device 130 with first measurement gaps to perform first measurements on the first carrier.

Initiating 504 providing a first indication based on a first result of the determination to at least one of: a) the first network node 111 and b) the wireless device 130, or another node in the wireless communications network 100.

In some examples, the method may further comprise one or more of the actions of:

Initiating 505 providing a second indication based on the first result of the determination to at least one of: a) the first network node 111 and b) the wireless device 130:
  The second indication may indicate at least one of:
  i. a second status of one or more carriers configured for the wireless device 130, and
  ii. a parameter related to the second measurements.

Obtaining 501 information regarding the first status of the first carrier.

Initiating 502 providing the obtained information to at least one of:
  the first network node 111, and the wireless device 130.

Figure 6:
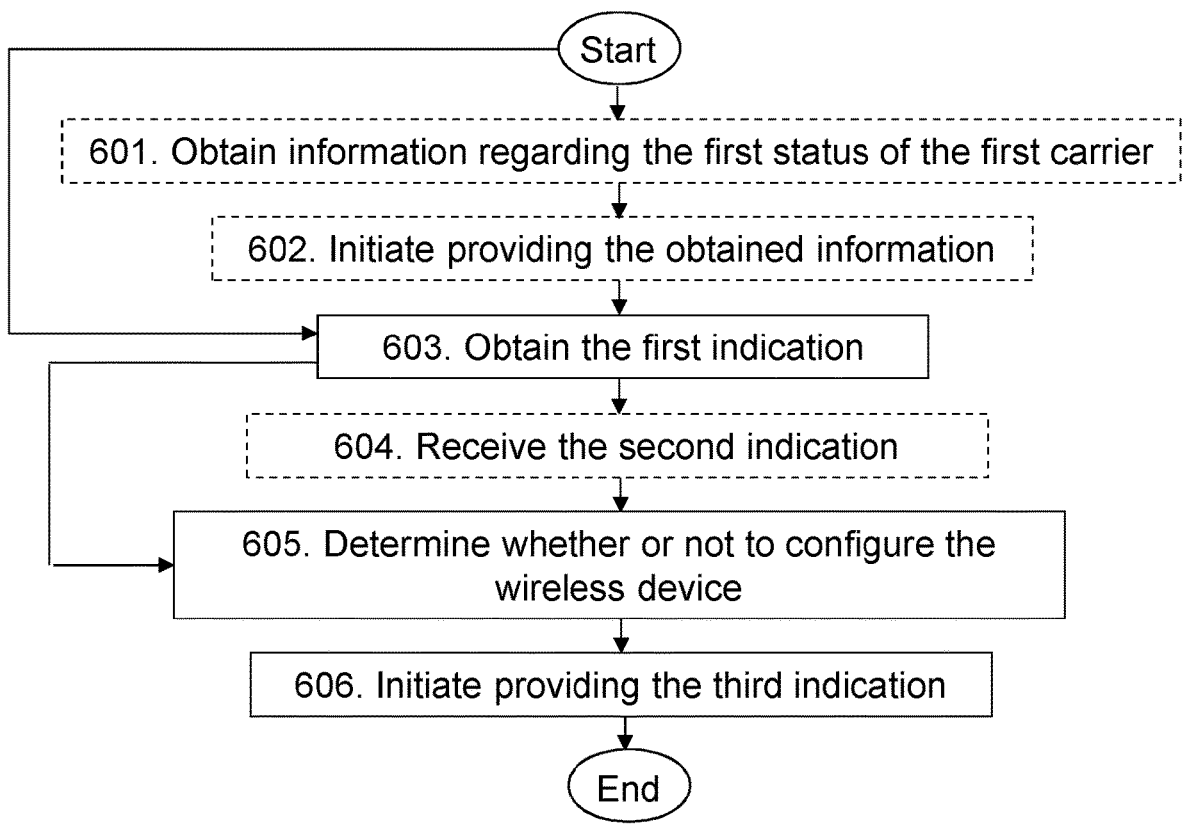
FIG. 6 is a flowchart depicting embodiments of a method in a first network node, according to embodiments herein.

The first network node 111 examples relate to FIG. 6 and FIG. 9.

A method performed by the first network node 111 may comprise one or more of the following actions. The method may be for handling a first configuration for first measurements, and/or a second configuration for second measurements, to be performed by the wireless device 130.

In some embodiments all the actions may be performed. In some embodiments, one or more actions may be performed. One or more embodiments may be combined, where applicable.

Obtaining 603 the first indication from the second network node 112. The first indication may be based on the first result of the determination by the second network node 112 of whether or not to configure the wireless device 130. The determination may be of whether or not to configure or reconfigure the wireless device 130 with the second configuration. The second configuration may be to configure the wireless device 130 with second measurement gaps to perform second measurements on the first carrier. The first result may be based on at least one of:
  i. the first status of the first carrier, and
  ii. whether or not the wireless device 130 is configured with the first configuration by the first network node 111, the first configuration being to configure the wireless device 130 with first measurement gaps to perform first measurements on the first carrier.

Determining 605 whether or not to configure the wireless device 130. The determining 605 may comprise determining whether or not to configure the wireless device 130 with a third configuration. The third configuration may be to configure the wireless device 130 with third measurement gaps to perform third measurements on the first carrier, the determining 605 being based on the received first indication.

Initiating 606 providing a third indication based on the second result of the determination of whether or not to configure the wireless device 130 with the third configuration to at least one of: a) the second network node 112 and b) the wireless device 130.

In some examples, the method may further comprise one or more of the actions of:

Obtaining 601 the information regarding the first status of the first carrier.

Initiating 602 providing the obtained information to at least one of:
  the second network node 112, and the wireless device 130.

Receiving 604 the second indication from the second network node 112. The second indication may be based on the first result, the second indication may be indicating at least one of:
  i. the second status of one or more carriers configured for the wireless device 130, and
  ii. the parameter related to the second measurements.

In some examples, at least one of the first network node 111 and the second network node 112 may be a NR network node.

Figure 7:
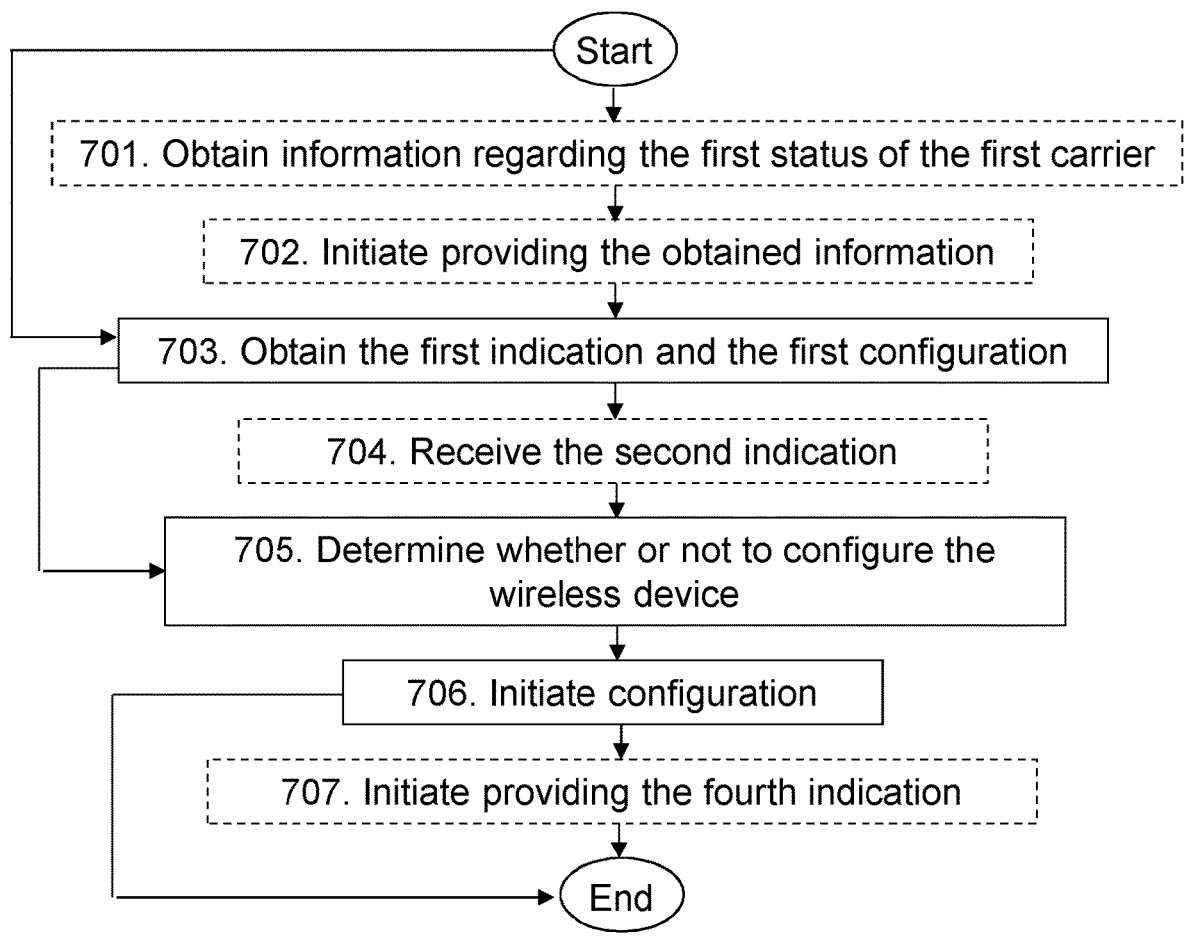
FIG. 7 is a flowchart depicting embodiments of a method in a wireless device, according to embodiments herein.

The wireless device 130 examples relate to FIG. 7, and FIG. 10.

A method performed by the wireless device 130 may comprise one or more of the following actions. The method may be for handling at least one of a first configuration for first measurements to be performed by the wireless device 130 and a second configuration for second measurements to be performed by the wireless device 130.

In some embodiments all the actions may be performed. In some embodiments, one or more actions may be performed. One or more embodiments may be combined, where applicable.

Obtaining 703:
  i. the first indication from the second network node 112. The first indication may be based on the first result of the determination by the second network node 112 of whether or not to configure the wireless device 130, e.g., with the second configuration; the second configuration may be to configure the wireless device 130 with second measurement gaps to perform second measurements on the first carrier; the first result may be based on at least one of:
    a. the first status of the first carrier, and
    b. whether or not the wireless device 130 is configured with a first configuration by the first network node 111, the first configuration being to configure the wireless device 130 with first measurement gaps to perform first measurements on the first carrier, and
  ii. the first configuration from the first network node 111.

In some examples, the wireless device 130 may obtain the third configuration from the first network node 111.

Determining 705 whether or not to configure the wireless device 130. The determining 705 may comprise determining whether or not to configure the wireless device 130 with at least one of: the second configuration and the first configuration.

Initiating 706 configuration of the wireless device 130 based on a third result of the determination 705 of whether or not to configure the wireless device 130.

In some examples, the method may further comprise one or more of the actions of:

Initiating 707 providing a fourth indication based on the third result of the determination to at least one of: a) the first network node 111 and b) the second network node 112.

Receiving 704 the second indication from at least one of: the second network node 112 and the first network node 111; the second indication may be based on the first result, the second indication may be indicating at least one of:
  i. the second status of one or more carriers configured for the wireless device 130, and
  ii. the parameter related to the second measurements.

Obtaining 701 the information regarding the first status of the first carrier.

Initiating 702 providing the obtained information to at least one of: the first network node 111, and the second network node 112.

The invention claimed is:

1. A method performed by a second network node, the method being for handling a second configuration for second measurements to be performed by a wireless device, the method comprising:
  determining whether or not to configure the wireless device with the second configuration, the second configuration being to configure the wireless device with second measurement gaps to perform second measurements on one of a first carrier and a second carrier, the determining being based on:
    i. a first status of the first carrier, and
    ii. whether or not the wireless device is configured with a first configuration by a first network node having a first communication with the wireless device, the first configuration being to configure the wireless device with first measurement gaps to perform first measurements on the first carrier, and
  initiating providing a first indication based on a first result of the determination to at least one of: a) the first network node and b) the wireless device; and
  receiving a fourth indication from the wireless device based on a third result of a determination by the wireless device whether or not to configure the wireless device with at least one of the second configuration and the first configuration.

2. The method of claim 1, further comprising:
  initiating providing a second indication based on the first result of the determination to at least one of a) the first network node and b) the wireless device, the second indication indicating at least one of:
    i. a second status of one or more carriers configured for the wireless device, and
    ii. a parameter related to the second measurements.

3. The method of claim 1, wherein at least one of the first network node and the second network node is an NR network node.

4. The method of claim 1, further comprising:
  obtaining information regarding the first status of the first carrier.

5. The method of claim 4, wherein the information is obtained from at least one of: the first network node, and the wireless device.

6. The method of claim 4, further comprising:
  initiating providing the obtained information to at least one of: the first network node, and the wireless device.

7. The method of claim 1, wherein a first carrier frequency of the first carrier is different than a second carrier frequency of the second carrier.

8. A method performed by a first network node, the method being for handling at least one of a first configuration for first measurements and a second configuration for second measurements to be performed by a wireless device having a first communication with the first network node, the method comprising:
  obtaining a first indication from a second network node having a second communication with the wireless device, the first indication being based on a first result of a determination by the second network node of whether or not to configure the wireless device with a second configuration, the second configuration being to configure the wireless device with second measurement gaps to perform the second measurements on a first carrier, the first result being based on:
    i. a first status of the first carrier, and
    ii. whether or not the wireless device is configured with a first configuration by the first network node, the first configuration being to configure the wireless device with first measurement gaps to perform first measurements on the first carrier,
  determining whether or not to configure the wireless device with a third configuration, the third configuration being to configure the wireless device with third measurement gaps to perform third measurements on the first carrier, the determining being based on the received first indication; and
  initiating providing a third indication based on a second result of the determination of whether or not to configure the wireless device with the third configuration to at least one of:

a) the second network node and
b) the wireless device; and
receiving a fourth indication from the wireless device based on a third result of a determination by the wireless device whether or not to configure the wireless device with at least one of the second configuration and the first configuration.

9. The method of claim 8, further comprising:
obtaining information regarding the first status of the first carrier.

10. The method of claim 9, wherein the information is obtained from at least one of: the second network node, and the wireless device.

11. The method of claim 10, further comprising:
initiating providing the obtained information to at least one of: the second network node, and the wireless device.

12. The method of claim 8, further comprising:
receiving a second indication from the second network node, the second indication being based on the first result, the second indication indicating at least one of:
 i. a second status of one or more carriers configured for the wireless device, and
 ii. a parameter related to the second measurements.

13. The method of claim 8, wherein: at least one of the first network node and the second network node is an NR network node.

14. The method of claim 8, wherein a first carrier frequency of the first carrier is different than a second carrier frequency of the second carrier.

15. A method performed by a wireless device, the method being for handling at least one of a first configuration for first measurements and a second configuration for second measurements to be performed by the wireless device, the wireless device having a first communication with a first network node, the method comprising:
obtaining:
 i. a first indication from a second network node having a second communication with the wireless device, the first indication being based on a first result of a determination by the second network node of whether or not to configure the wireless device with a second configuration, the second configuration being to configure the wireless device with second measurement gaps to perform the second measurements on one of a first carrier and a second carrier, the first result being based on:
  a. a first status of the first carrier, and
  b. whether or not the wireless device is configured with a first configuration by the first network node, the first configuration being to configure the wireless device with first measurement gaps to perform first measurements on the first carrier, and
 ii. the first configuration from the first network node,
determining whether or not to configure the wireless device with at least one of the second configuration and the first configuration,
initiating configuration of the wireless device based on a third result of the determination of whether or not to configure the wireless device; and
initiating providing a fourth indication based on the third result of the determination to at least one of a) the first network node and b) the second network node.

16. The method of claim 15, wherein the determination of whether or not to configure the wireless device is further based on the first status of the first carrier.

17. The method of claim 15, further comprising:
receiving a second indication from at least one of the second network node and the first network node, the second indication being based on the first result, the second indication indicating at least one of:
 i. a second status of one or more carriers configured for the wireless device, and
 ii. a parameter related to the second measurements.

18. The method of claim 15, further comprising: obtaining information regarding the first status of the first carrier.

19. The method of claim 18, wherein the information is obtained from at least one of: the first network node, and the second network node.

20. The method of claim 18, further comprising:
initiating providing the obtained information to at least one of: the first network node, and the second network node.

21. The method of claim 15, wherein at least one of the first network node and the second network node is an NR network node.

22. The method of claim 15, wherein a first carrier frequency of the first carrier is different than a second carrier frequency of the second carrier.

23. A second network node configured to handle a second configuration for second measurements configured to be performed by a wireless device, the second network node comprising:
one or more processors; and
one or more memory circuits coupled to the one or more processors and comprising, stored therein, program code for execution by the one or more processors, whereby the second network node is configured to:
 determine whether or not to configure the wireless device with the second configuration, the second configuration being to configure the wireless device with second measurement gaps to perform second measurements on one of:
 a first carrier and a second carrier, wherein to determine is configured to be based on:
  i. a first status of the first carrier, and
  ii. whether or not the wireless device is configured with a first configuration by a first network node being configured to have a first communication with the wireless device, the first configuration being to configure the wireless device with first measurement gaps to perform first measurements on the first carrier, and
 initiate providing a first indication based on a first result of the determination to at least one of a) the first network node and b) the wireless device; and
 receive a fourth indication from the wireless device based on a third result of a determination by the wireless device whether or not to configure the wireless device with at least one of the second configuration and the first configuration.

24. The second network node of claim 23, further configured to:
initiate providing a second indication based on the first result of the determination to at least one of: a) the first network node and b) the wireless device,
the second indication being configured to indicate at least one of:
 i. a second status of one or more carriers configured for the wireless device, and
 ii. a parameter related to the second measurements.

25. The second network node according to any of claim 23, further configured to:
- obtain information regarding the first status of the first carrier,
- initiate providing the information configured to be obtained to at least one of: the first network node, and the wireless device.

* * * * *